United States Patent [19]
Koenck et al.

[11] Patent Number: 5,912,926
[45] Date of Patent: *Jun. 15, 1999

[54] METHOD OF AND APPARATUS FOR CONTROLLING MODULATION OF DIGITAL SIGNALS IN FREQUENCY MODULATED TRANSMISSIONS

[75] Inventors: Steven E. Koenck; Ronald L. Mahany; William W. Frede, all of Cedar Rapids, Iowa

[73] Assignee: Norand Corporation, Cedar Rapids, Iowa

[*] Notice: This patent is subject to a terminal disclaimer.

[21] Appl. No.: 08/711,524

[22] Filed: Sep. 10, 1996

Related U.S. Application Data

[63] Continuation of application No. 08/205,639, Mar. 4, 1994, Pat. No. 5,555,276, which is a continuation-in-part of application No. 07/735,128, Jul. 22, 1991, Pat. No. 5,365,546, which is a continuation-in-part of application No. 07/467,096, Jan. 18, 1990, Pat. No. 5,052,020.

[51] Int. Cl.[6] .......................... H04L 27/04; H04L 27/12; H04L 27/20
[52] U.S. Cl. ..................... 375/295; 375/295; 375/302; 375/303; 375/219; 375/223; 375/376; 331/9; 331/10; 332/100; 332/123; 332/127; 332/128
[58] Field of Search ..................... 375/295, 303, 375/302, 376, 223, 219; 331/1, 9, 10, 1 R; 332/123, 128, 127, 100

[56] References Cited

U.S. PATENT DOCUMENTS

| | | |
|---|---|---|
| 4,207,527 | 6/1980 | Abt . |
| 4,411,005 | 10/1983 | Leslie . |
| 4,540,897 | 9/1985 | Takaoka . |
| 4,556,983 | 12/1985 | Heitmann et al. . |
| 4,584,690 | 4/1986 | Cafiero et al. . |
| 4,755,774 | 7/1988 | Heck .......................................... 332/18 |
| 4,897,857 | 1/1990 | Wakatsuki et al. . |
| 4,910,753 | 3/1990 | Wakatsuki et al. . |
| 4,994,768 | 2/1991 | Shepherd et al. ........................ 332/127 |
| 5,052,020 | 9/1991 | Koenck et al. ............................ 375/62 |
| 5,311,152 | 5/1994 | Lautzenhiser . |
| 5,365,546 | 11/1994 | Koenck et al. .............................. 375/9 |
| 5,555,276 | 9/1996 | Koenck et al. ........................... 375/303 |

*Primary Examiner*—Stephen Chin
*Assistant Examiner*—Michael W. Maddox
*Attorney, Agent, or Firm*—Cowan, Liebowitz & Latman

[57] ABSTRACT

A programmable apparatus is disclosed for generating a frequency modulated signal at a selected center frequency in accordance with digital data of at least first and second data levels. The modulating apparatus comprises a modulator having an input and an output and is responsive to an input modulation signal applied to its input for generating at its output the frequency modulated signal at a center frequency dependent on a quiescent voltage appearing at its input. A circuit is provided for sampling and storing a value of the quiescent voltage. An addressable memory stores a plurality of offsets. A programmable adding circuit adds a downloaded offset voltage to the stored value of the quiescent voltage to output a high modulation voltage. A programmable subtracting circuit subtracts a downloaded offset voltage from the stored value of the quiescent voltage to provide a low modulation voltage. An addressing circuit addresses the memory in accordance with a data transmission parameter for downloading a corresponding offset to the adding and subtracting circuits. A switch or multiplexor is coupled to the subtracting and adding circuits and to receive the digital data for generating and applying to the modulator input an input modulation signal comprising a sequence of the high and low modulation voltages in accordance respectively with the first and second data levels of the digital data.

12 Claims, 14 Drawing Sheets

FIG. 1
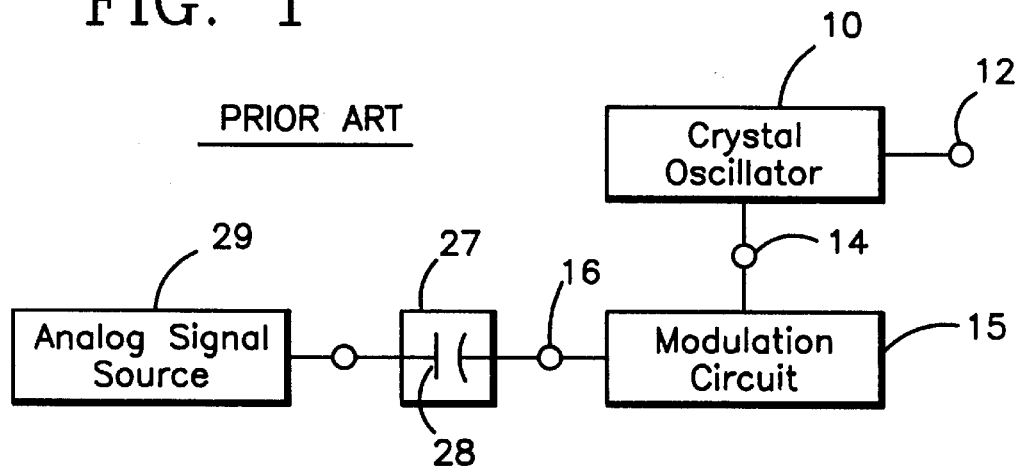
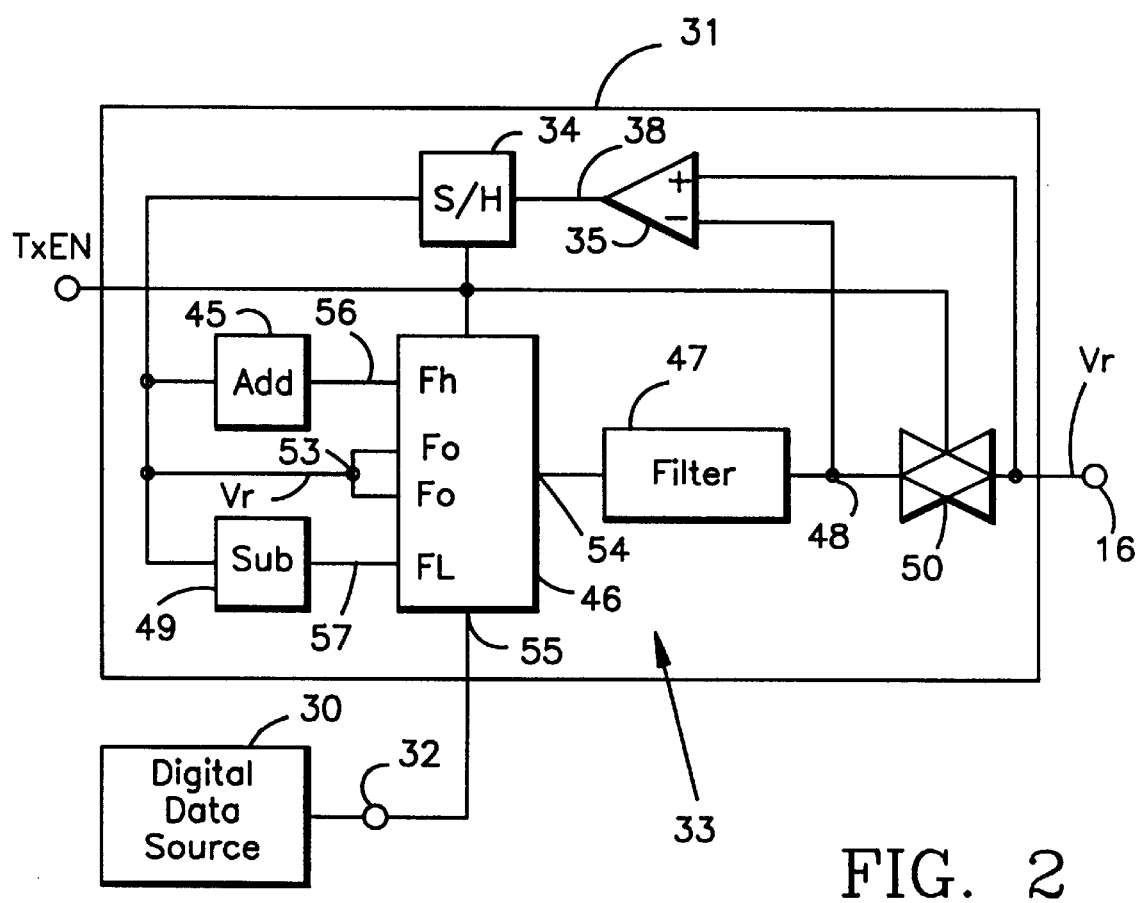
FIG. 2

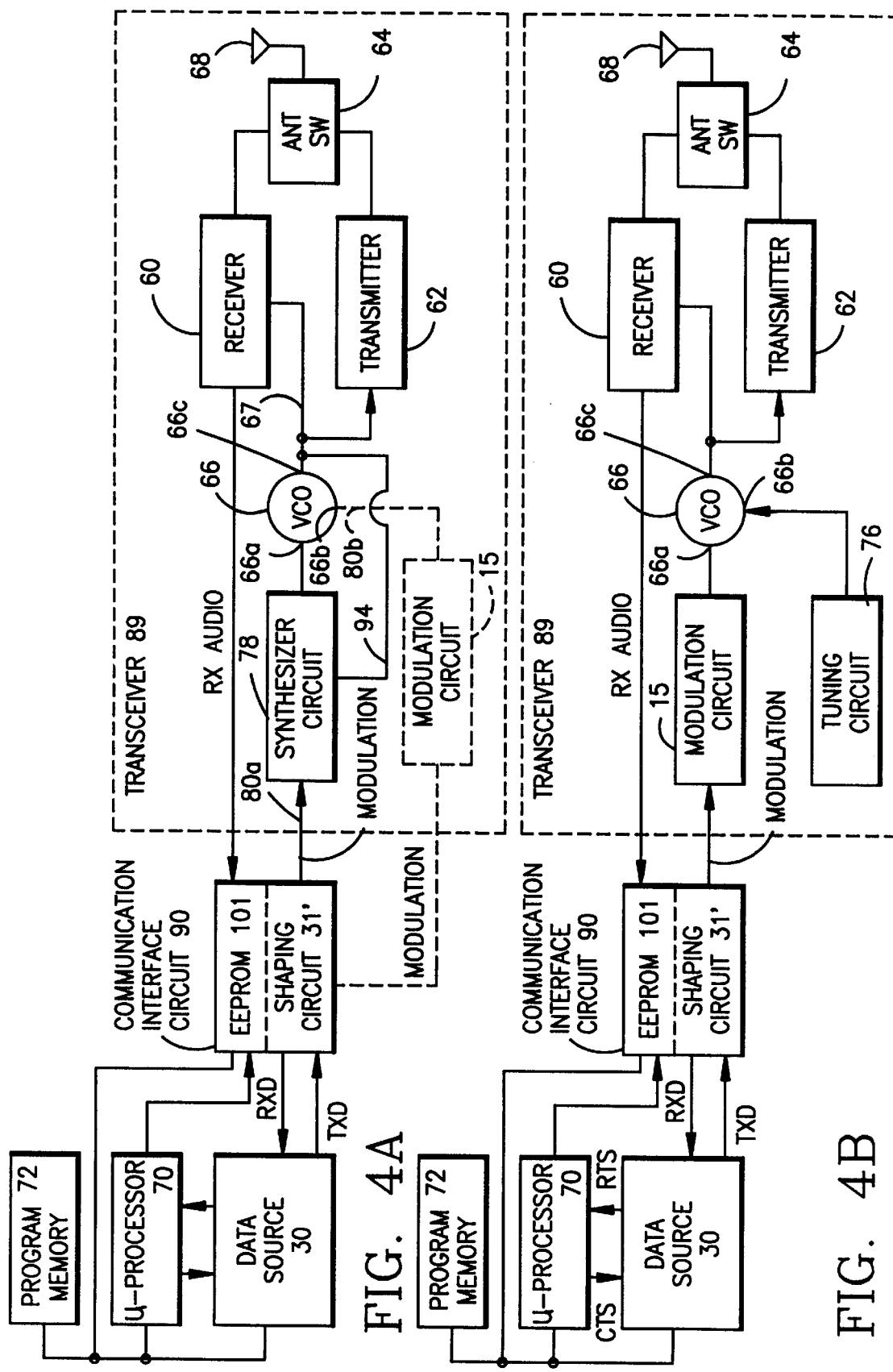

$$\frac{Fvco}{N} = \frac{Fref}{R}$$

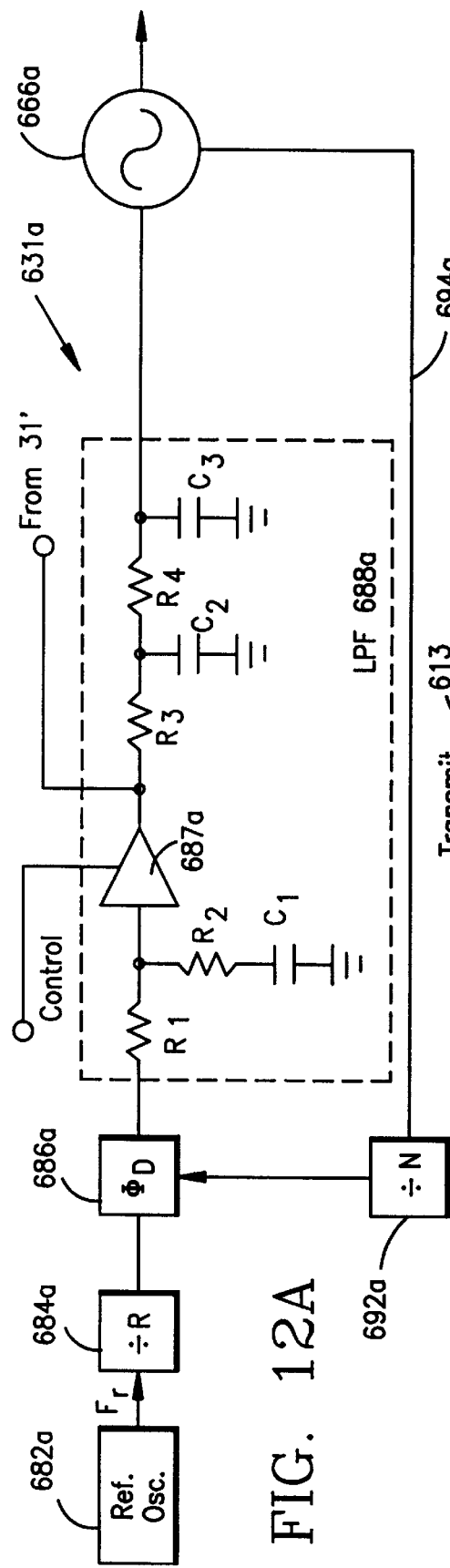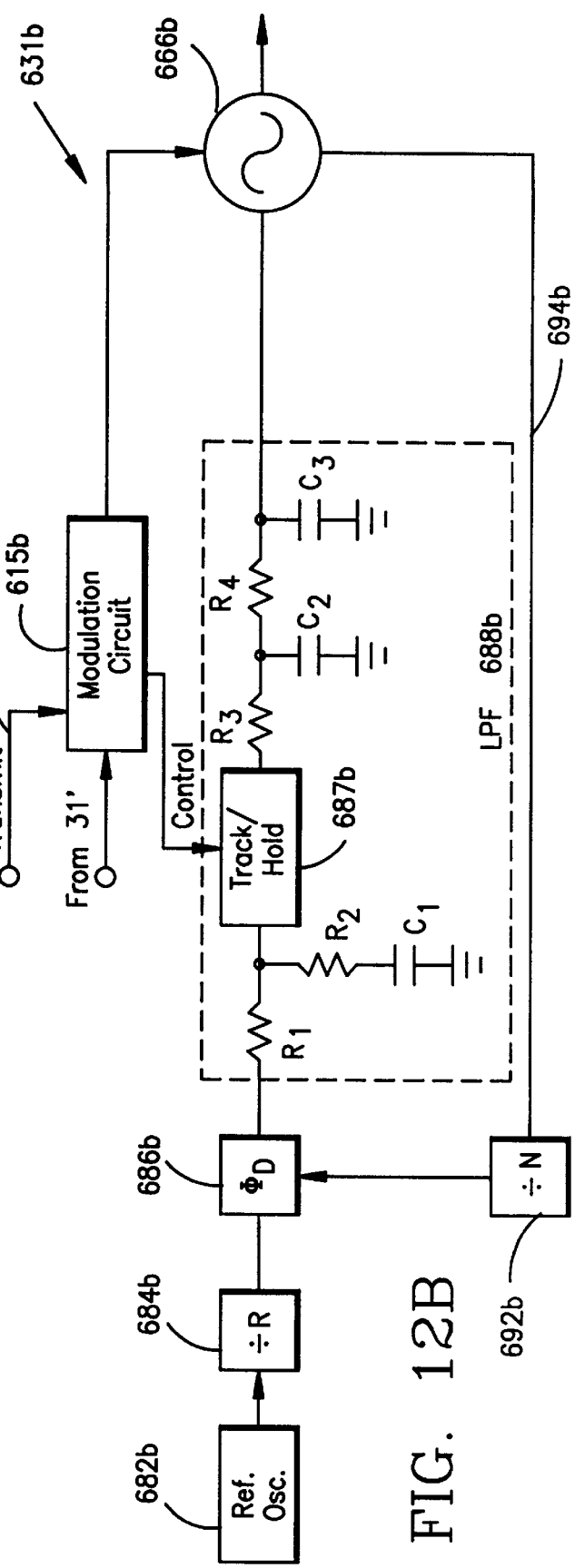
FIG. 12A
FIG. 12B

METHOD OF AND APPARATUS FOR CONTROLLING MODULATION OF DIGITAL SIGNALS IN FREQUENCY MODULATED TRANSMISSIONS

CROSS REFERENCE TO RELATED APPLICATIONS

This is a continuation of application by S. E. Koenck, R. L. Mahany and W. W. Frede, Ser. No. 08/205,639 filed Mar. 4, 1994, now U.S. Pat. No. 5,555,276, which is a continuation-in-part of application by S, E. Koenck, R. L. Mahany and W. W. Frede, Ser. No. 07/735,128 filed Jul. 22, 1991, now U.S. Pat. No. 5,365,546, which is a continuation-in-part of application by S. E. Koenck and R. L. Mahany, Ser. No. 07/467,096 filed Jan. 18, 1990, now U.S. Pat. No. 5,052,020.

FIELD OF THE INVENTION

The invention relates generally to communicating digital signals messages and particularly to radio transmission of such digital messages at a controlled, stable operating frequency.

BACKGROUND OF THE INVENTION

Standards for most radio-frequency communications are of such stringency that temperature compensation networks are generally necessary to enable crystal oscillator circuits to maintain an established channel frequency over a specified temperature range. Compensation networks, typically including a thermistor, are used to stabilize carrier frequencies $F_c$ of crystal oscillator circuits over typically specified temperature ranges, such as from negative thirty degrees centigrade to positive sixty degrees centigrade.

Several radio frequency transceiver modules for conventional audio transmissions are available from commercial suppliers. Each may differ in interface, timing and analog characteristics. Even though input and output characteristics of transceiver modules may differ, their operating modes are similar. While it might be desirable to adapt available audio-type transceivers to the communication of data in the form of digital signals in binary format, particular interface problems present themselves primarily because of asymmetric signal amplitudes with respect to a quiescent, or steady state, signal level or voltage of a data signal string in comparison to a typical voice communication sequence. Further problems relate to communicating strings of binary digital signals over a radio frequency environment between digital type end user modules, particularly when various transceiver modules of the environment respond to different bias conditions or timing characteristics.

A state of the art FM modulating circuit typically includes a series coupled combination of a capacitor and a varactor diode. The node between the varactor diode and the capacitor is adapted to receive a voltage type signal input for modulating the channel frequency output of the crystal oscillator circuit. Variations in voltages of input signals to the node cause corresponding shifts in the capacitance of the varactor diode and, hence, in the frequency of oscillation of the oscillator circuit. Consequently, the quiescent or steady state voltage at the node constitutes a signal voltage reference at which the crystal oscillator circuit oscillates at its unmodulated channel frequency $F_c$. Temperature compensation, typically including a thermistor circuit, is applied to the node to compensate for temperature related shifts in performance of the components.

Voice signals typically have no DC component. Such signals can consequently be superimposed through a series-coupled input capacitor on the established, temperature compensated voltage at the node. Without a DC current input to the node the reference voltage at the node and, hence, the channel frequency $F_c$ of the circuit remain stable. If capacitive coupling is not used, and the signal impressed on the input node does include a DC component which differs from the temperature-compensated steady state reference voltage at the node, the reference voltage at the node would be shifted. Such shift, in turn, would shift the channel frequency $F_c$ of the transmission signal with respect to which the modulated signal is centered. Depending on the magnitude of the voltage shift, the modulated frequencies may become shifted beyond allowable limits, such as, for example, those established by the Federal Communication Commission.

Digital data signals typically include a DC component which would tend to cause such signals applied through the typical capacitive coupling to become distorted with what is referred to as "jitter". In state of the art digital signal transmissions, jitter is controlled by electronic transformation or encoding of digital signals. Encoding and subsequent decoding of signals is likely to affect, however, the speed or reliability of data transmission between transceivers.

Consequently, it would be desirable to transmit digital signals over any of various types of traditional voice frequency transceiver units without a need for encoding and subsequently decoding the data signals and not to be concerned about eliminating DC components from a digital data string. It would further be desirable to allow an interfacing of data signals at given signalling rates and signal levels between various types of communication modules by means of any of such various types of voice frequency transceiver units.

SUMMARY OF THE INVENTION

It is therefore an object of this invention to generate modulation output about a stabilized center frequency.

It is a further object of this invention to program a modulator as the function of a selected transmitting parameter(s) to improve modulation sensitivity over a broad range of such parameters.

It is a more particular object of this invention to achieve improved modulation sensitivity for a wide range of output center frequencies and/or data baud transmission rates.

In accordance with these and other objects of the invention, this invention comprises a programmable apparatus for generating a frequency modulated signal at a selected center frequency $F_c$ in accordance with digital data of at least first and second data levels. The modulating apparatus comprises a modulator having an input and an output and is responsive to an input modulation signal applied to its input for generating at its output the frequency modulated signal at a center frequency dependent on a quiescent voltage appearing at its input. A circuit is provided for sampling and storing a value of the quiescent voltage. An addressable memory stores a plurality of offsets. A programmable adding circuit adds a downloaded offset voltage to the stored value of the quiescent voltage to output a high modulation voltage. A programmable subtracting circuit subtracts a downloaded offset voltage from the stored value of the quiescent voltage to provide a low modulation voltage. An addressing circuit addresses the memory in accordance with a data transmission parameter for downloading a corresponding offset to the adding and subtracting circuits.

A switch or multiplexor is coupled to the subtracting and adding circuits and to receive the digital data for generating and applying to the modulator input an input modulation signal comprising a sequence of the high and low modulation voltages in accordance respectively with the first and second data levels of the digital data.

In a second aspect of this invention, modulating apparatus comprises a voltage controlled oscillator, which has an input and an output, and is responsive to an input modulation signal applied to its input for generating at its output the frequency modulation signal at a stable center frequency $F_c$. A phase lock loop is interconnected between the input and the output of the voltage controlled oscillator and comprises a reference oscillator for generating at its output a reference frequency signal $F_{ref}$, a phase detector connected to the reference oscillator output and to the voltage controlled oscillator output for receiving the reference frequency signal and the frequency modulated signal and for providing at its output a signal indicative of the phase difference therebetween, and a filter coupled to the phase detector for filtering the phase difference signal and applying at its output a filtered signal to the voltage controlled oscillator input, whereby the center frequency is stabilized. Further, an insert circuit provides the modulation signal as a sequence of high and low modulation level signals in accordance with the digital data and inserts the input modulation signal into the phase lock loop.

In a further aspect of this invention, the reference oscillator includes an input forming a reference modulation port, and the inserting circuit is coupled to the reference modulation port for applying the input modulation signal thereto. There is further included a balancing circuit for receiving and apportioning the input modulating signal into a first portion applied to the reference modulation port and a second portion applied to a voltage controlled oscillator modulation port.

BRIEF DESCRIPTION OF THE DRAWINGS

The Detailed Description of the Invention including a detailed description of a preferred embodiment thereof will be best understood when read in reference to the accompanying drawings wherein:

FIG. 1 is a schematic diagram of a representative modulation and crystal oscillator circuit of the prior art to which the present invention applies;

FIG. 2 is a schematic diagram of a digital data transmission signal input shaping circuit, implemented in analog signal functions;

FIGS. 4A and B are schematic diagrams showing similar embodiments of a functional combination of a data terminal and a transceiver which are coupled via a communication interface circuit including features of the present invention;

FIGS. 12A and B are respectively alternative embodiments of the synthesizer circuits shown in FIGS. 9A and 10A adapted for open loop operation.

DETAILED DESCRIPTION OF THE INVENTION

A Crystal Oscillator

Figure 3:
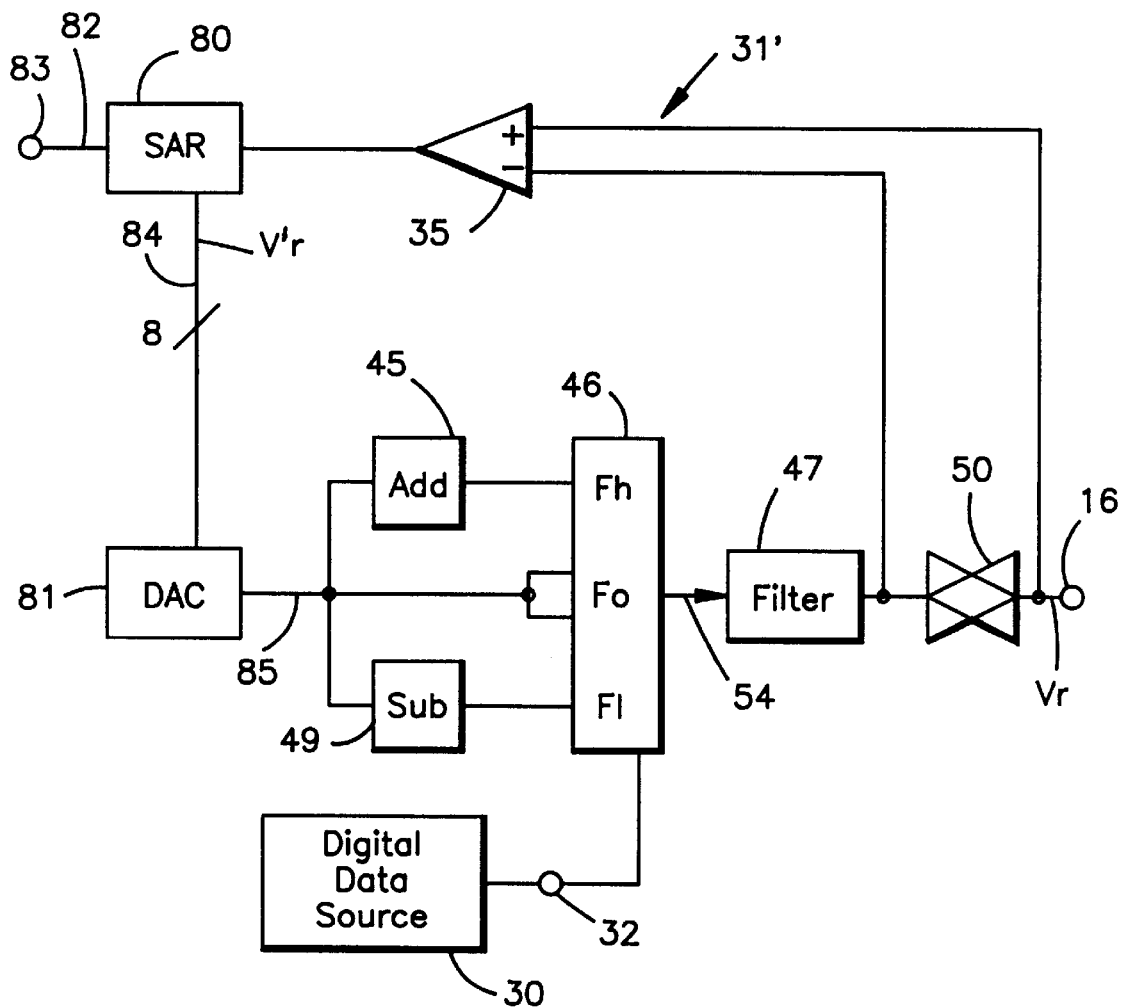
FIG. 3 is a schematic diagram of a digital data transmission signal shaping circuit wherein the shaping function is implemented with digital logic and is then converted to analog signal levels.

FIG. 1 shows a prior art crystal oscillator circuit 10 of a typical, state of the art radio frequency voice transmission radio. During the operation of the oscillator circuit 10, the frequency modulated signal on the output terminal 12 corresponds to the voltage of a bias signal applied to the signal input terminal 14. The signal input terminal 14 represents an open end of a capacitive loading network of the oscillator circuit 10. A modulation circuit 15 typically capacitively coupled between the crystal oscillator 10 and a modulation input terminal 16 typically includes temperature compensation circuits. Operational details of a typical prior art modulation circuit 15 are disclosed in copending application by S. E. Koenck and R. L. Mahany, Ser. No. 07/467,096, filed Jan. 18, 1990, now U.S. Pat. No. 5,052,020.

A capacitive coupling circuit designated generally by the numeral 27, represented generically in FIG. 1 by a capacitor 28, is typically interposed between the modulation input terminal 16 and an analog signal source 29, such as microphone or other amplified voice or sound signal source. The coupling through the capacitor 28 isolates any DC component of the modulation signal source 29. It is desirable to apply a digital data modulation signal from a digital data source 30 as shown in FIG. 2 to the modulation input terminal 16 without having to apply the digital data stream through the capacitor 28.

A Data Transmission Shaping Circuit

The descriptive portions of the specification of referenced copending application, Ser. No. 07/467,096, filed Jan. 18, 1990, now U.S. Pat. No. 5,052,020, assigned to the assignee of the present application, are in their entirety incorporated herein by reference. The incorporated descriptive matter of the specification discloses as shown in FIG. 2 particularly a data transmission shaping circuit 31 which effectively neutralizes any DC signal effects of binary or digitally encoded data transmissions and allows digitally encoded signal messages to be applied directly to the modulation input terminal 16 of the modulation circuit 15 without the need for the capacitive coupling circuit 27. The disclosed circuit 31 executes the desired functions in an analog type operation. A reference signal is directly sampled and held as an analog signal voltage. High and low modulation signal amplitudes are generated by adding and subtracting predetermined voltage levels from the sampled reference voltage.

FIG. 2 is a block diagram of major functional elements to refer in general to the analog signal shaping circuit 31 for generating binary signal amplitudes for digital data transmissions, as described in detail in the above referred to copending application. Functionally, the circuit 31 is interposed between a transmitted data input terminal 32 and the modulation input terminal 16. The transmitted data input terminal 32 may be coupled to, and is symbolically representative of an input terminal for any of a number of sources of digital data which may be generated, transmitted or otherwise provided to be applied to the modulation input terminal 16. It is understood that digital data may be a single data pulse or a string or train of data pulses comprised of any combination of logical "ones" and "zeroes", hence data pulses of typically two different signal levels or voltages with respect to a reference voltage or datum $V_r$. One of the signal levels may be at ground, and ground may also be used as the reference. Signals of various amplitudes may be applied to the shaping circuit 31. The shaping circuit 31 generates signal levels, or voltages of a predetermined amplitude, which voltages are then applied in substitution to the terminal 16 as herein further described.

The shaping circuit 31 includes a signal level, or voltage referencing functional component group 33 which interacts with a selectively activated signal sampling circuit 34. An input amplifier 35 couples the sampling circuit 34 to the terminal 16 and applies a sampled quiescent, or steady state, bias signal or reference voltage $V'_r$ from the terminal 16 through an output signal terminal 38 to the sampling circuit 34. The sampling circuit 34 then holds the sampled voltage as the reference voltage $V'_r$. The signal level referencing component group 33 generates appropriate signal levels for logical "ones" and "zeroes" with respect to the sampled reference voltage $V'_r$. To generate a logical "one" signal, for example, an adder circuit 45 superimposes the signal level onto the sampled reference voltage $V'_r$. When during a transmit enable period ("TxEN") digital data signals of typically unregulated amplitude levels are applied to the transmitted data input terminal 32, an analog switch or multiplexor 46 is activated. The switch 46 generates in accordance with the logical ones and zeroes of the transmitted digital data signals a bias signal sequence of precisely defined voltage levels with respect to the sampled reference voltage $V'_r$ at the sample and hold circuit 34. The bias signal sequence is passed from the switch 46 through a low pass, signal shaping filter 47 to an output terminal 48 and from there to the terminal 16. A subtract circuit 49 subtracts the signal level from the sampled reference voltage $V'_r$ to generate logical zero signals of the bias signal sequence.

During the voltage sampling phase in the absence of a transmit enable signal as identified in FIG. 2 by the designation "TxEN", the output terminal 48 from the filter 47 remains isolated from the modulation input terminal 16 by a solid state switch 50 which remains open during the voltage sampling phase and is driven into a closed or shorted state at the beginning of a signal transmission by the transmit enable signal TxEN. The open state of the switch 50 during the voltage sampling or non-transmit phase also isolates the steady state reference voltage $V_r$ at the modulation input terminal 16 from being shorted to the feedback voltage at the output terminal 48 of the filter 47.

The transmit enable signal TxEN is also applied to the analog switch 46, setting the switch 46 from its $F_0$ or rest position to a signal transmit position. In the described embodiment, the switch 46 is a typical circuit having two sets of switchable terminals. One such set of two terminals is coupled together or in parallel to form a single terminal 53, also designated on the diagram in FIG. 2 by $F_0$. In the rest position, namely the absence of the transmit enable signal TxEN, the switch 46 couples the sampled reference voltage $V'_r$ between the terminal 53 and an output terminal 54. During transmit enable periods, data in binary or digital format are applied to a respective data input terminal 55, and the switch 46 toggles between high and low signal voltage terminals 56 and 57 ($F_h$ and $F_l$) to pass respective high or low data pulses to the filter 47 in response to high or low binary data input signals appearing at the data input terminal 55.

The filter 47 is a typical data transmission filter which shapes transitional profiles of the data signal pulses in preparation for their application as a frequency modulation input at the terminal 16. The respective magnitudes of the voltages applied to the filter 47 remain referenced with respect to the steady state DC bias voltage $V_r$ at such modulation input terminal 16 as sampled during the most recent update by the selectively activated sampling circuit 34. Frequency shifts which might have resulted from a DC component of the transmitted data string applied to the terminal 16 are avoided.

A Digitally Controlled Signal Shaping Circuit

A digitally implemented version of the analog shaping circuit 31 of FIG. 2 is shown in FIG. 3, where it is identified by the numeral 31'. The shaping circuit 31' comprises digital circuits in place of certain, analog circuits which were included in the embodiment of FIG. 2. Because of conversions between digital and analog signals, a digital circuit methodology in an essentially analog environment may appear more cumbersome. However, as will be seen, digital control of reference values provides added advantages and accuracy. The shaping circuit 31' is described in referenced, co-pending application Ser. No. 07/467,096, now U.S. Pat. No. 5,052,020 which is incorporated herein in its entirety by reference.

The shaping circuit 31' uses digital signal processing methodology for controlling the level of the sampled quiescent signal or reference voltage $V'_r$. In FIG. 3, the sampling circuit 34 of FIG. 2 is replaced with a digital reference signal level sampling circuit which illustratively takes the form of a successive approximation register circuit 80 ("SAR"), which samples the reference voltage $V_r$ and stores it as a digital signal. A digital-to-analog converter 81 ("DAC") is connected by a bus 84 to the SAR 80 to convert these digital samples of the reference voltage $V'_r$ into corresponding analog signals. Both the SAR 80 and the DAC 81 are components that are known in the art. Storing an analog signal voltage as a digitally encoded value for use after conversion to an analog signal by the DAC 81 allows the equivalent digital value of the reference voltage $V'_r$ to be stored at its encoded value for an indefinite time. This is in contrast to storing the analog signal as a charge in a capacitor which may undergo changes in time to affect the desired deviations of the ultimately generated modulated signal. The terminal 16 is coupled in the described manner through the amplifier 35 to the SAR 80 to apply the quiescent signal level $V_r$ to the SAR 80. The SAR 80 uses a well known successive approximation function to sample the quiescent signal level $V_r$ to convert it to, and to store, the equivalent digital, binary encoded, reference value $V'_r$.

The SAR 80 samples the reference voltage $V_r$ periodically when selectively activated by an enablement signal applied via an enablement input terminal 83 and a control line 82 to the SAR 80. Selectively controlling the enablement signal in turn allows the timing and sampling rate of the SAR 80 to be readily controlled.

Typically, the digital value of the sampled reference voltage $V'_r$ is an eight bit digital word, although a greater or lesser number of bits can be used for greater or lesser resolution of the sampled voltage. The digital approximation signal is preferably applied in parallel as an output signal from the SAR 80 to the DAC 81 via the data line or bus 84. Of course the number of individual data output lines in the parallel line or bus 84 corresponds typically to the number of bits encoded as the digital value of the sampled reference voltage $V'_r$.

The enablement signal only enables the SAR 80 when a new sample of the quiescent signal or reference voltage $V'_r$ is to be sampled and processed thereby. The new processed value of the sampled reference voltage $V'_r$ will be retained by the SAR 80 until it is again activated by the enablement signal for a subsequent sampling of the quiescent signal level. The DAC 81 converts the digital approximation signal appearing on bus 84 to an analog voltage equivalent to the sampled reference voltage $V'_r$ and applies the corresponding analog voltage signal via output line 85 to the respective analog circuits, such as the adder circuit 45, the subtractor circuit 49 and the analog switch 46 in the generation of the modulated data signal as described with respect to FIG. 2, for example.

A Digitally Controlled Communication Interface Circuit

FIGS. 4A and B show schematically, as a block diagram, alternative embodiments of the coupling of the digital data source 30 to an analog communications channel or device 89. The analog communication device may illustratively include an analog FM radio frequency transceiver 89, which illustratively includes among other elements a transmitter 62 and a receiver 60. The advantages, though particularly applicable to the FM analog transceiver 89, as described herein, may be similarly realizable when it is desired to interactively couple the digital data source 30 to an analog device other than the described transceiver 89. In accordance herewith, the digital data source 30 is functionally coupled to the transceiver 89 via a communication interface circuit which is designated generally by the numeral 90. In operation, the digital data source 30 may transfer data TXD via the communication interface circuit 90 to the radio transceiver 89 to be transmitted by the transmitter 62 thereof. Alternatively, the digital data source 30 receives digital data RXD from the receiver 60 of the radio transceiver 89 via the communication interface circuit 90. A microprocessor 70 operates under control of programs stored in a program memory 72 to generate control signals which are also relayed via the communication interface circuit 90 to power up the transceiver 89, or to shut it down. Thus, in general, the communication interface circuit 90 interacts in substantially all functions between the microprocessor 70 and the radio transceiver 89.

Still referring to FIGS. 4A and B, the transceiver 89 further comprises an antenna switch 64, which is controlled by the microprocessor 70 to interconnect either the receiver 60 or the transmitter 62 to an antenna 68 dependent on whether the transceiver 89 is operating to receive FM radio signals or to transmit them. The communication interface circuit 90 includes among other elements (as will be described in detail below) a memory in the form of an EEPROM 101 and the digitally implemented signal shaping circuit 31', which outputs at the terminal 16 the bias signal sequence of precisely defined high or low voltage levels according to the ones or zeroes of the digital data provided by the source 30. In the embodiment of FIG. 4A, this bias signal sequence is applied to a synthesizer circuit 78, whose output is applied to a tuning port 66*a* of a voltage controlled oscillator (VCO) 66. The bias signal sequence of the signal shaping circuit 31' provides a modulation input to the VCO 66 and, in the absence of the synthesizer circuit 78, the output of the vco 66 would be destabilized meaning that it exhibits substantial center frequency error. The synthesizer circuit 78 is coupled to receive an output appearing on the output port 66*c* of the VCO 66 and to act as a phase locked feedback loop whereby the output frequency of the VCO 66 is maintained within a narrow range about its center frequency $F_c$. The VCO 66 of FIG. 4A is stabilized by the synthesizer circuit 78 and may use a less stable type of VCO 66.

As will be explained below, the modulation output is feedback via a conductor 94 to the synthesizer circuit 78. As shown in FIG. 4A, the terminal 16 is connected to a first port 80*a* of the synthesizer circuit 78. The synthesizer circuit 78 of FIG. 4A is configured to permit the modulation to be applied also via a second port 80*b* of the synthesizer circuit 78. As shown by the dotted line, a further modulation input is applied via the modulation circuit 15 to the second port 80*b*, which is connected to a modulation port 66*b* of the VCO 66.

In the embodiment of FIG. 4B, a tuning circuit 76 provides a steady voltage to the tuning port 66*a* of the VCO 66, whereby the center frequency of $F_c$ the modulation output appearing on its output port 66*c* is fixed. Input modulation in this embodiment is derived from the shaping circuit 31' and is applied via the modulation circuit 15 to the modulation port 66*b* of the VCO 66. The embodiment of FIG. 4B is not particularly suited for the less stable types of VCOs as may be employed in FIG. 4A, but rather requires a VCO 66 with inherent stability, e.g., a crystal or SAW controlled oscillator.

As will become apparent from the following description of the communication interface circuit 90, significant functions for normalizing radio received signals may have independent significance with respect to other functions for adapting digital data messages to be transmitted over the radio frequency transmitter 62, and vice versa. However, added advantages reside in the described controls for fully interfacing signals in both directions across the interface circuit 90, between the digital data source 30 and the transceiver 89.

Various commercially available transceivers 89 for voice or analog type frequency modulation are found to be adaptable for digital signal transmissions with the function as implemented by the above-described signal shaping circuit 31'. However, operating characteristics of various transceivers 89 vary among each other and particularly among different types, or those from different manufacturers. Operating voltages, frequency deviations in response to applied modulation signal levels, noise characteristics resulting from switching between transmit and receive operations, carrier detect threshold levels, DC bias levels and signal to bias level of received signals are variable transceiver characteristics. The communication interface circuit 90 includes circuit functions for normalizing various operating characteristics of selected transceivers 89. As a result, variations of transceiver operating characteristics from a norm become transparent to the digital data source 30. As may be realized from the further description hereof, the communication interface circuit 90 employs digital logic for the manipulation of analog quantities to produce normalized, desired output functions from the transceiver 89.

The details of the communication interface circuit 90 is described below with reference to FIGS. 5A, B, C and D.

Figure 5A:
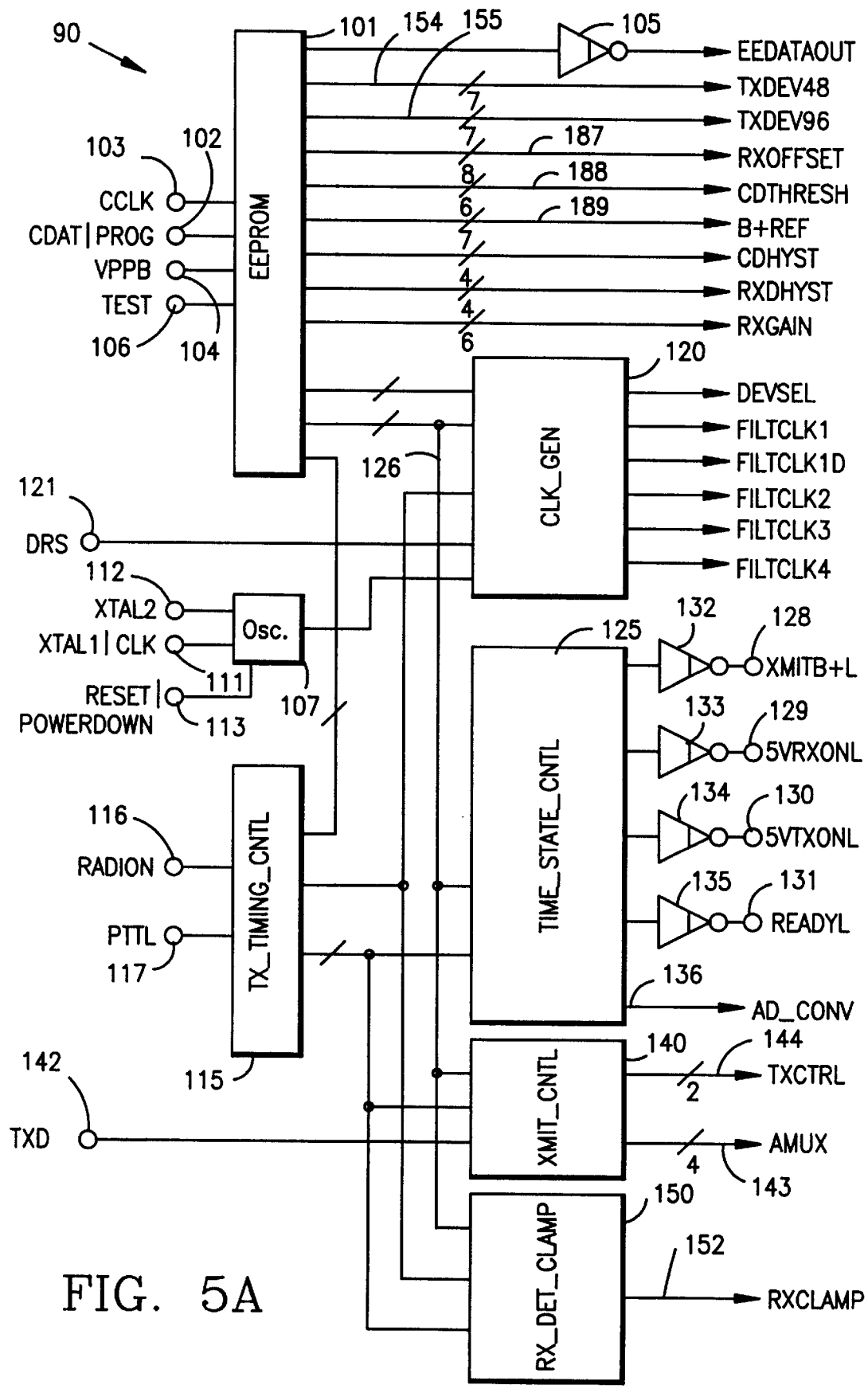
FIGS. 5A, B, C and D are schematic diagrams of circuits and functions of the communication interface circuit shown in FIGS. 4A and B.

Since described functions flow between the illustrations of FIGS. 5A, B, C and D, the continuing terminations are identified with outgoing and inward pointing arrow heads and with names of functions for identification. Circuit terminations which become coupled to one of the digital data source 30, the microprocessor 70 or the transceiver 89 are identified by circles. It should be understood that in a preferred embodiment of the invention as an integrated circuit, it may be desired to protect each of such contact pads with typical electrostatic discharge ("ESD") protection circuits in accordance with known techniques as may be available from commercial chip design and supply sources.

FIG. 5A illustrates "housekeeping" functions of the communication interface circuit 90. Such housekeeping functions include generation of a circuit-specific time cycle for the communication interface circuit 90 and timing signals to sequentially start up and shut down a transmit function of the transceiver 89 (in FIGS. 4A and B), and to switch between transmit and receive states of the transceiver 89. The time cycle may be, for example, a sixteen-state cycle during which a certain number of control states are used to power up the transmitting function of the transceiver 89, followed by a time period during which data are transmitted, with a remainder of the cycle used to power down the transmitting function. A time state locking function may hold the control states in a certain state until after the release of the "PTTL" function. Also, a data receive function selectively may be delayed following the end of a data transmit cycle.

The communication interface circuit 90 is configured to a specific transceiver 89 by programmed reference values stored in the electrically programmable read-only memory register or circuit 101 ("EEPROM"). In general, digital logic values or data are stored in the EEPROM 101 to be decoded and used in the determination of timing pulse sequences or lengths, or for establishing magnitudes or shapes of control signals for a particular transceiver 89. It should be understood that within the scope of the invention a circuit element other than the non-volatile EEPROM 101 may be used for storing such data. However, the EEPROM 101 provides a nonvolatile memory in combination with the ability to change programmed reference values if necessary. The stored reference values constitute a look-up table of values which are used in the operations of the communication interface circuit 90. Typically, the reference values are loaded into the EEPROM 101 once the characteristics of the particular radio have been established and are not subject to change over the service life of the transceiver 89.

The reference values are either already known, or may be determined by fine tuning the operation of, or calibrating, a particular transceiver 89 to achieve the desired normalized operating characteristics from the particular transceiver 89. Once the transceiver 90 has been calibrated, all values are stored in the EEPROM 101 in a single programming operation. In a preferred embodiment of the communication interface circuit 90 in the form of an integrated circuit, the EEPROM 101 has the capability of storing 127 bits of data. The bit pattern is programmed serially into the EEPROM 101 on its CDAT/PROG input terminal 102 with a configuration clock signal applied to its CCLK terminal 103. The terminal 104 provides for a programming voltage ("VPPB") to be applied to the EEPROM 101. The programming voltage must have a controlled ramp-up voltage, a hold voltage, and a ramp-down voltage for the EEPROM bits or data to become properly programmed or loaded. Once loaded, the data may be verified by parallel loading a verification register of the EEPROM 101 and then shifting the data out to be verified via a buffered output terminal 105 ("EEDATAOUT"), activated by pulsing the test terminal 106 ("TEST") to a logical high.

Figure 6:
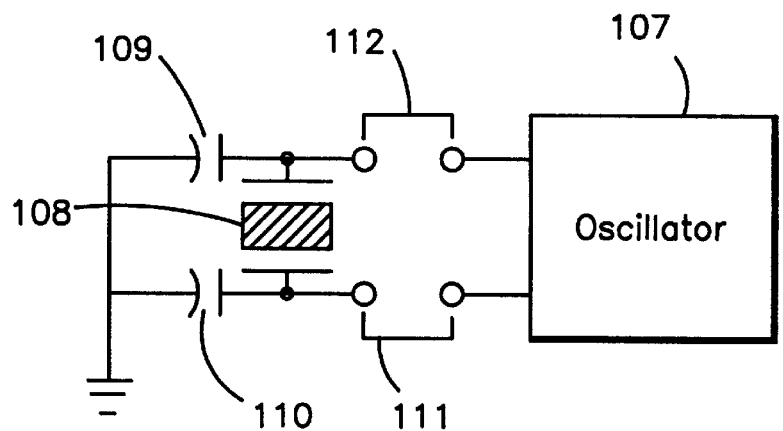
FIG. 6 is a schematic diagram showing an external attachment of an oscillator crystal and a capacitor network to an oscillator circuit shown in FIG. 5A.

In an EEPROM 101 of 127-bit storage capacity, 21 different programmable reference values of preferred length may be stored. The number of storage bits needed for each of the quantities may vary according to the complexity of the stored number. For a look-up value which represents one of a relatively large number of possible choices of values, a greater number of bits are reserved than for a reference quantity which represents merely a "yes-or-no" choice to be stored with a logical one or zero in a single bit of the EEPROM 101. The reference values which are desirably programmed into the look-up table of the EEPROM 101 may be applied to individually tailor either digital or analog functions. Digital functions or quantities which may be determined by stored reference values are generally timing signal frequencies, timed signal lengths, or a signal inversion choice relating to a transmitted or outgoing data signal. Analog functions which may be predetermined by stored digital reference values may be signal levels or voltage levels of bias voltages, for example. Though some programmed reference values may have been provided as a matter of convenience, others are advantageous in implementing the features of the invention. Though the storing of particular reference values in the EEPROM 101 may be in furtherance of achieving advantages of the invention, it should be understood that alternative ways of selectively altering affected characteristics of the described circuit are envisioned. Also, in reference to bit lengths of stored values, it should be realized that in a majority of the stored values the number of bits allocated to each value is a matter of choice. All timing functions are generally based on, but not directly activated by, a master clock function. The master clock function is illustrated by an oscillator circuit 107 ("OSC"). The oscillator circuit 107 provides for flexibility in that a crystal 108 within a desirable range may be externally attached (see FIG. 6) to drive the communication interface circuit 90. In the alternative, an external clocking signal may be applied. When the external crystal 108 is used (as shown in FIG. 6), the respective crystal 108 and capacitors 109 and 110 may be coupled across clock terminals 111 and 112 ("XTAL1/CLK" and "XTAL2", respectively). When the external clocking signal is used, a CMOS logic level signal may be connected to the terminal 111, the terminal 112 being left unconnected. A terminal 113 ("RESET/POWERDOWN") is a reset terminal through which reset and power down signals may be applied. For the communication interface circuit 90 to be powered continuously by a battery of the digital data source 30, for example, current consumption in the shutdown mode of the communication interface circuit 90 is desirably at a minimum. The RESET/POWERDOWN signal desirably provides a dual function of applying a reset signal to the communication interface circuit 90 and also applying a low current bias signal to analog circuit portions of the communication interface circuit 90.

A transmitter timing control circuit 115 ("TX_TIMING_CNTL") supports a power control function, and a transmit and receive mode switching function. When a "RADION" signal at terminal 116 is at a logical zero, or low, power to the transceiver 89 is turned off, and circuit portions which support various radio operations are also powered down, placing the transceiver 89 into a standby or sleep mode to conserve power. Circuit elements which preferably would become disabled in the shutdown mode include typical digital input pullup elements, filters, amplifiers and power control circuits. Also, all digital output signals from the communication interface circuit 90 are disabled. The clock oscillator 107 continues to operate. However, the clock output will not be gated to other respective circuit elements of the communication interface circuit 90. Terminal 117 of the timing control circuit 115 receives the push-to-talk or transmit-receive switching signal ("PTTL"). The PTTL function is preferably chosen such that when the transmit-receive signal is in a logical one or high signal state, the communication interface circuit 90 is in a data receive mode with transmit functions being inactive. In this mode, the transceiver 89 may receive data to be relayed to the digital data source 30. When the PTTL-signal at the terminal 117 is driven "low", the transmit mode of the communication interface circuit 90 becomes activated.

A clock generator circuit 120 ("CLK_GEN") represents a timing signal generator circuit for a number of timing signals of programmable duration or frequencies. A signal length, signal delay length, or a frequency would be derived from a decoded reference value of one of the predetermined values stored in the EEPROM 101. The transmit cycle clock generation function of the clock generator circuit 120 is driven by the master clock oscillator circuit 107 to generate a transmit timing cycle clock signal ("TX_TIMING_CLK"). For example, from a four-bit digital value programmed into the EEPROM 101, decoded frequency divisors in a chosen range from 8 through 262,144 may be obtained. The resulting transmit timing cycle clock signal in turn becomes an elemental timing unit, a predetermined multiple of which constitutes a single transmit timing cycle. In the described communication interface circuit 90, a sequence of sixteen timing cycle clock signals constitutes a basic transmit cycle. The frequency of the timing cycle clock signal is programmable as a ratio of clock pulses from the master clock oscillator circuit 107. A frequency division ratio may be chosen, for example, to provide a transmit timing signal frequency of 1,000 hz, for example, resulting in a timing cycle of 16 milliseconds. In generating the desired transmit timing clock signal frequency, the clock generator circuit 120 accesses and decodes a reference value stored in the EEPROM 101. The RESET/POWERDOWN signal from the oscillator circuit 107 is coupled to the clock generator circuit 120 to reset the transmit timing signal cycle.

Figure 5B:
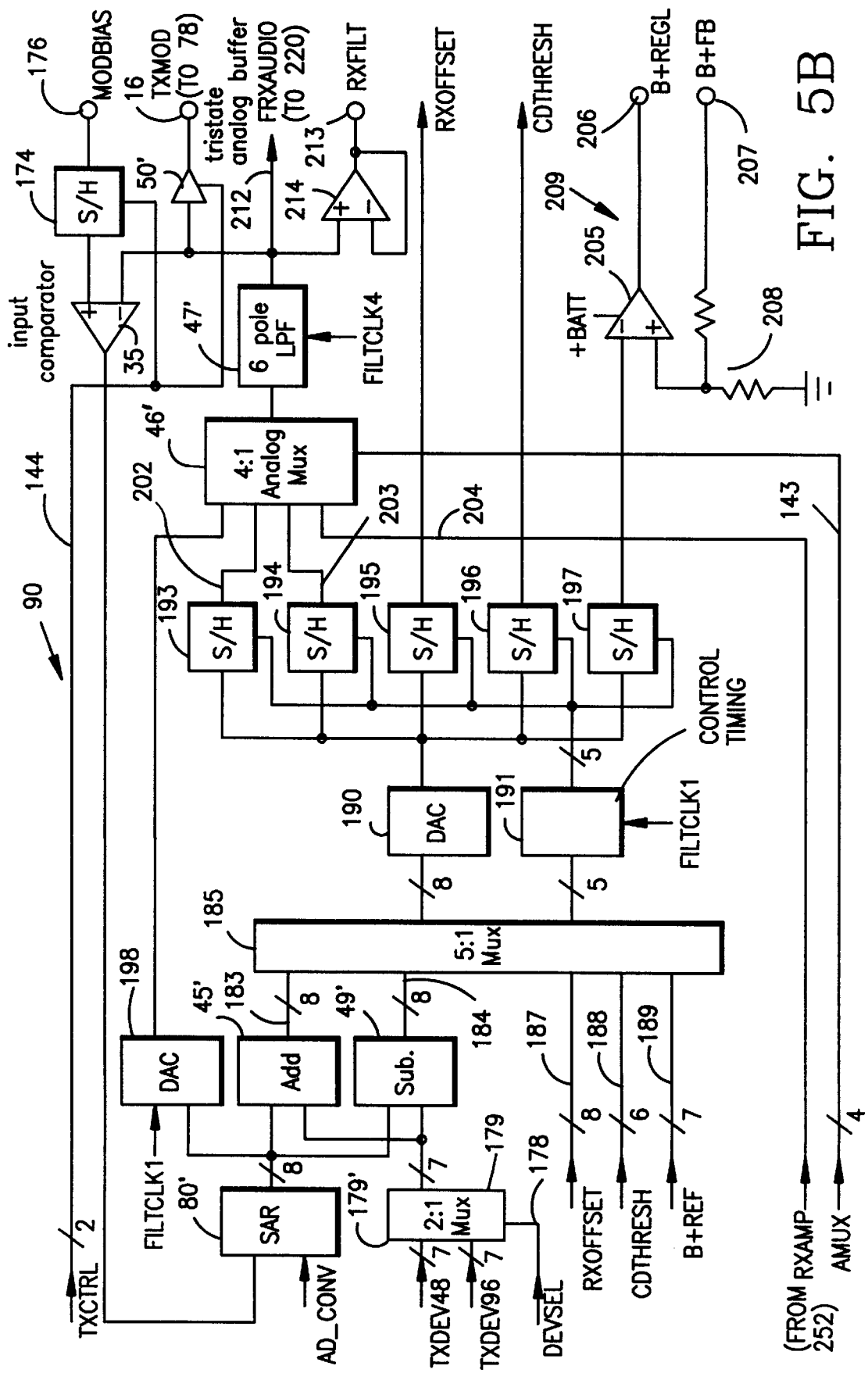
Figure 5C:
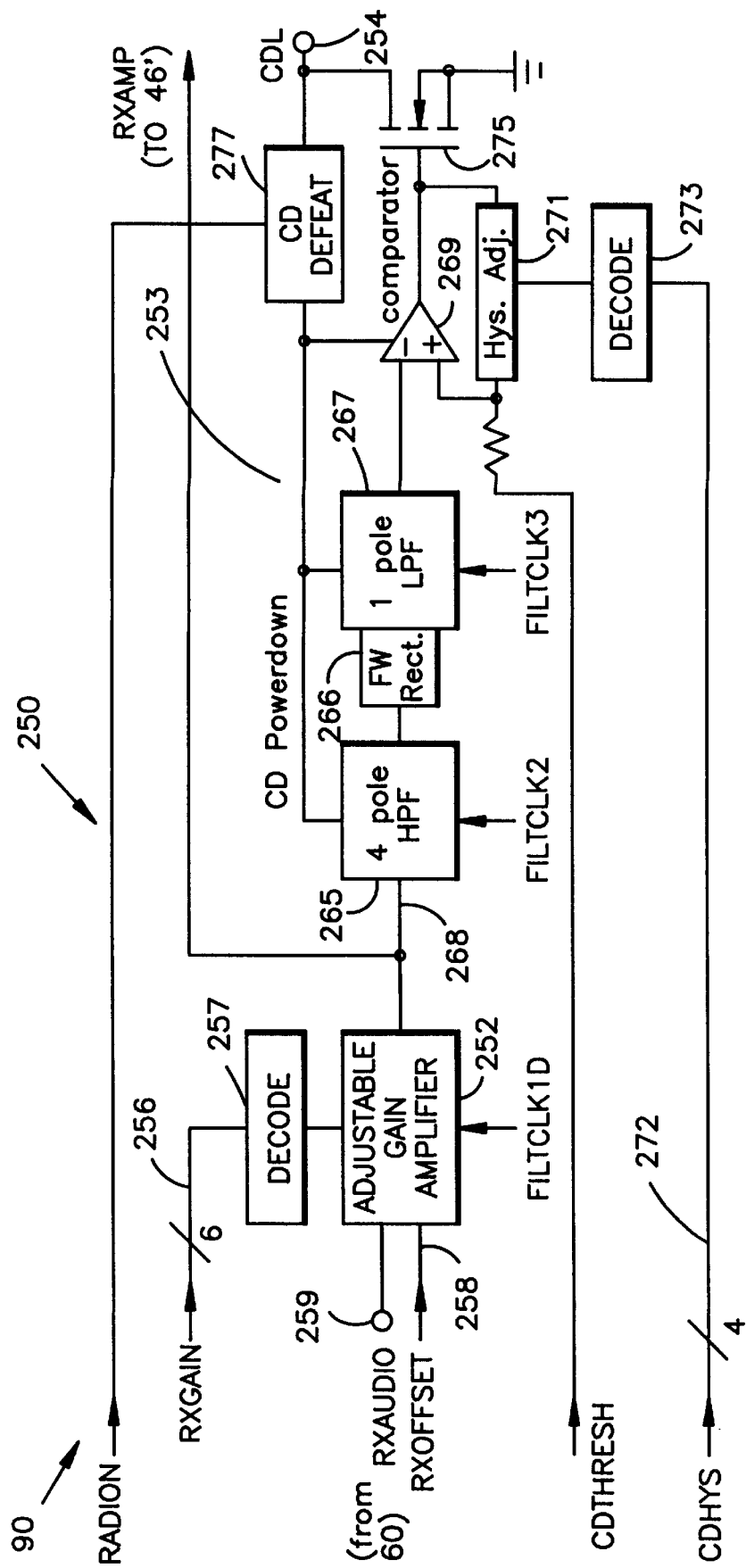

The master clock signal is further applied to generate programmed various clock signals, such as the filter clock signals FILTCLK1, FILTCLK1D, FILTCLK2, FILTCLK3 and FILTCLK4, for example. These clock signals are applied as functional clock signal inputs to respective filter and digital-to-analog converter functions, as shown in FIGS. 5B and 5C. Each of the clock signals has a frequency of a predetermined ratio of the master clock frequency of the oscillator circuit 107. The particular ratio of each of the clock signals is established by decoding a reference value stored in a designated location of the EEPROM 101, and is programmable to optimize the respective function to which it is applied. A data rate select signal (DRS) may be applied to the clock generator circuit 120 via input terminal 121, the signal being indicative of a selected data rate. In response to the data rate selection, the FILTCLK1 signal may be altered to provide a correspondingly faster or slower clocking rate. The DRS signal may further provide a DEVSEL signal during the transmit mode of the communication interface circuit 90.

The transmit timing clock signals generated by the transmit timing control circuit 115 are applied to a time state control circuit 125 ("TIME_STATE_CNTL"). The time state control circuit 125 accesses programmed values from the EEPROM 101 via data bus 126 to provide selected transmit and receive control functions. In a preferred embodiment the time state control circuit 125 generates 16 control states. Following state 15, the time state control circuit 125 will hold or wait in the "zero" state. Also, a timing control lock signal value ("TXTIMINGLOCK") may be programmed into the EEPROM 101 to reserve certain timing states for start up control signals and the remainder of the states in the cycle for the generation of signals needed during the shutdown of the transmit cycle. The time state control circuit 125 will "lock" when a state is reached, which corresponds to the programmed value, until the PTTL has been released.

External signals provided by the time state control circuit 125 are shown in FIG. 5A on terminals 128 through 131 as XMITB+L, 5VRXONL, 5VTXONL and READYL, respectively. In various signal designations referred to herein, those ending with the letter "L", indicate that the respective active state of the signal is a low or logical "zero" state. The XMITB+L signal at terminal 128 controls the activation of a transmit power amplifier section (not separately shown) of the transmitter 62 shown in FIGS. 4A and 4B. The transmit power may need to be delayed into the start up cycle until the quiescent state bias voltage of the respective transmit oscillator circuit at the terminal 16 (FIGS. 4A and 4B) has been sensed and locked in. Consequently a particular timing value for the XMITB+L value is programmed into EEPROM 101 to permit the signal length to be fully variable over the entire period of the transmit timing cycle. Various driver signal outputs may be buffered as shown at 132 through 135. The XMITB+L output may drive an external transistor switch through an external current limiting resistor through its buffer as schematically indicated at 132. The 5VRXONL signal is shown at terminal 129. The output signal may drive in one configuration an external transistor switch through an external current limiting resistor, the buffer shown schematically at 133, to provide power to the receiver 60. Since power-up and power-down times may vary among receivers 60, the signal length is also fully programmable within the transmit timing cycle. Similarly, the 5VTXONL signal at the terminal 130 is a programmable control signal for the control of the transmitter 62. The output signal also may drive an external transistor switch through an external current limiting resistor, its buffer shown schematically at 134, to power-up the transmitter 62. At the end of a transmission operation, the signal would be removed to, conversely, power down the transmitter 62. In that power-up and power-down cycle times may differ among various types of the transceiver module 89, the signal is also programmable over the entire transmit timing cycle. The READYL signal is a signal which may be communicated to the digital data source 30, also in reference to FIGS. 4A and 4B, to indicate that after a transmit cycle, or upon initial power-up of the transceiver 89, the transceiver 89 is in a ready state. In the ready state the transceiver 89 may receive a string of data from the digital data source 30 for transmission. The READYL is applied through a buffer as indicated at 135. A further time state signal generated by the time state control circuit 125 is a circuit-specific internal control signal referred to as AD_CONV or "Analog to Digital Conversion" control signal, as shown at 136. The internal signal AD_CONV does not require an external pull-up or pull-down circuit and is applied to the SAR 80' as will be described in further reference to FIG. 5B.

Further in reference to FIG. 5A, a transmit control circuit or function 140 ("XMIT_CNTL") is coupled to the EEPROM 101 via bus 126, is further coupled to an internal signal corresponding to the XMITB+L signal referred to above, and receives the PTTL signal from the transmit timing control function 115. The transmit control circuit 140 further is coupled via terminal 142 to the digital data source 30 to receive a data string or data message of digital (binary coded) signals (TDX) from the digital data source 30. A single bit decision data inversion value ("TXINV") is preferably gated into the TDX signal to determine the sense or polarity of high and low signals to be transferred from the digital data source 30 to the transmitter 62. The data inversion decision relates to the manner in which the respective transmitter 62 treats data signals for transmission. If an inversion invariably takes place during the transmission of data messages, the TXINV signal needs to effect a second inversion to enable the signals to be received with an expected sense or polarity orientation. The output signals or control signals of the transmit control circuit 140 are a data control signal ("AMUX") applied to a four-line data bus 143 and a transmit-receive control signal ("TXCTRL") applied to a two-line data bus 144, the function of which signals being best understood in reference to FIG. 5B.

Figure 7:
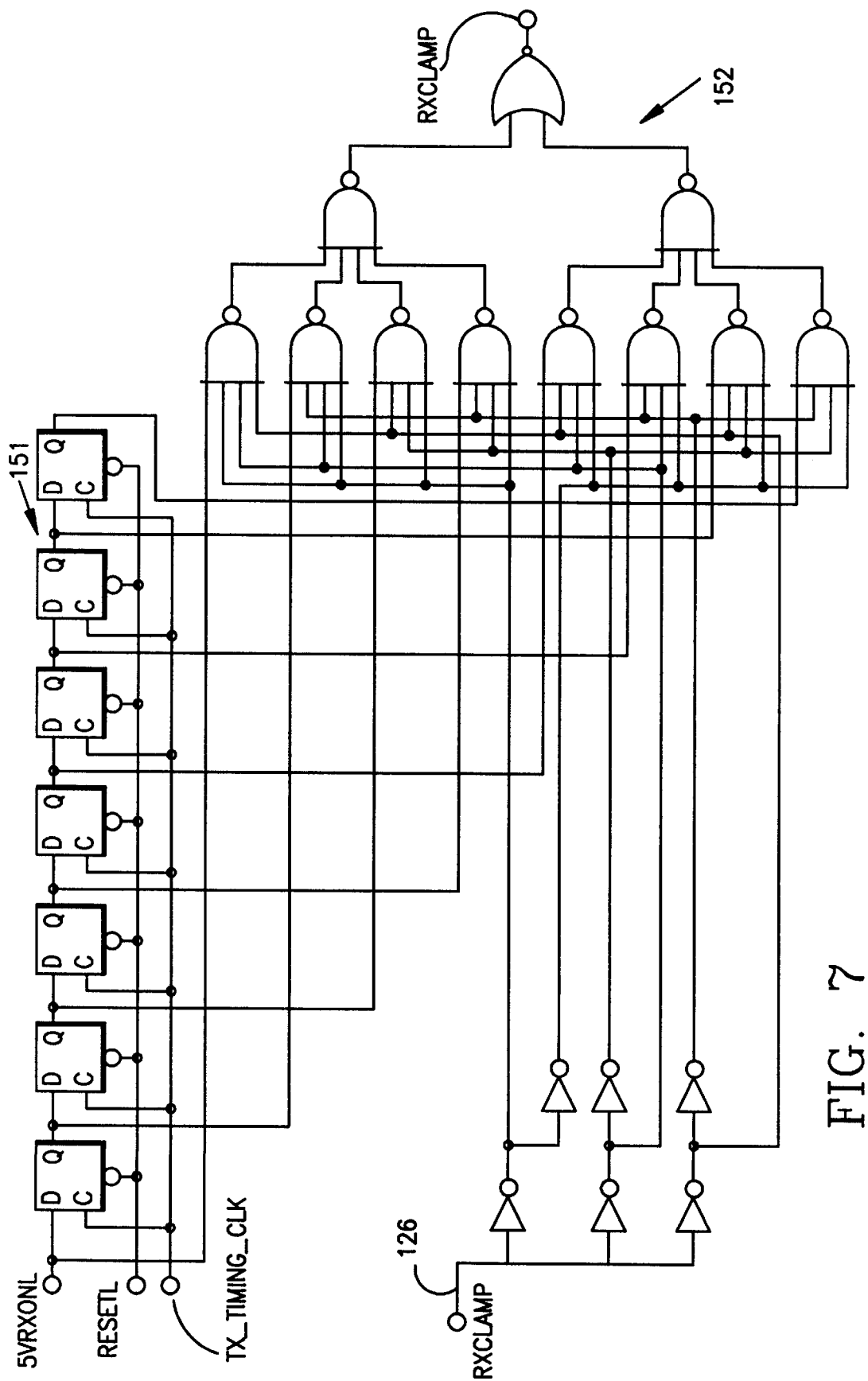
FIG. 7 is a schematic diagram of a receive detector clamp control circuit, showing a digital reference value decoding and gating circuit as a preferred implementation of decoding a reference value in accordance herewith.

Further in reference to FIGS. 5A and 7, a receive detector clamp control circuit or function 150 is coupled via the data bus 126 to the EEPROM 101 to access a three-bit word RXCLAMP stored in the EEPROM 101. The receive detector clamp circuit 150 includes a data flip-flop circuit bank 151 which may be reset with the RESET/POWERONL ("RESETL") signal as shown in FIG. 7 as a preferred gate level representation of the receive detector clamp control circuit 150 in FIG. 5A. The flip-flop bank 151 is clocked by the TX_TIMING_CLK signal to sample and shift an unbuffered timed signal 5VRXONL as generated by the time state control circuit 125 into its bank 151 of flip-flops. The sampled and shifted bits are applied in accordance with their sampled delay to a bank 152 of NAND gates. As shown in FIG. 7, the value for the stored three-bit work RXCLAMP is also decoded and is gated with the decoded 5VRXONL at the NAND gate bank 152. The resulting output signal RXCLAMP consequently contains a programmed delay component of 1 through 8 states of the 5VRXONL signal. The RXCLAMP signal is further applied as best seen with respect to FIG. 5D.

Again in reference to FIG. 5A, the EEPROM 101 provides further for storing reference values for selected signal deviation or offset values. For example, TXDEV48 and TXDEV96 selectively quantify signal deviation levels for preferred 4800 and 9600 baud binary data transmission bias signal levels at the modulation input terminal 16 (FIGS. 4A and B). The TXDEV48 and TXDEV96 signals are read out of the EEPROM 101 over respective signal bus lines 154 and 155. Other stored reference values pertain to the generation of control signals RXOFFSET, CDTHRESH and B+REF. The respective stored values are read from the EEPROM 101 over respective signal control bus lines 187, 188 and 189. Their application, as well as that of the TXDEV48 and TXDEV96 signals may be understood in reference to FIG. 5B.

A second, different set of deviation levels or offsets may also be stored in the EEPROM 101 and used as will be explained below with respect to FIG. 8 to compensate for a variation of the VCO frequency of operation. It is appreciated that the first mentioned set of modulation offsets can be combined with the second set of offsets, which serve to compensate for the VCO frequency of operation. A variety of other communication parameters may be stored in EEPROM as suggested in FIG. 10A to permit programmed changes in the modulation, transmitting and receiving of digital data. As other communication parameters are stored in the EEPROM 101, its storage capacity would need to be increased. Alternatively, the programmable communication parameters may be stored in the program memory 72 shown in FIGS. 4A and B, which provides a larger data storage capacity than that of the EEPROM 101 and may be downloaded through the communication interface circuit 90 to the transceiver 89.

FIG. 5B represents that portion of the communication interface circuit 90, which includes the functions and corresponding elements of the digital shaping circuit 31' described above with respect to FIG. 3; in FIG. 5B, such similar elements will be identified by like numerals with a prime added thereto. Various of the previously described timing and control signals are applied to the interfacing circuit 90 as shown in FIG. 5B. The timing and control signals determine timing sequences and signal levels of data signals transferred between the digital data source 30 and the transceiver 89. The TXCTRL signal is applied via data line 144 to a sample-and-hold (S/H) circuit element 174 which preferably precedes the amplifier 35. The TXCTRL signal is further applied to drive the switch 50' which takes the illustrative form of a tri-state analog buffer and applies the modulated signal levels to the terminal 16. The modulated signal drives the frequency modulation of the transmitter 62 (FIGS. 4A and B). It should be understood that the terminal 16 may be coupled directly to a modulator bias signal terminal 176 when the radio modulation input signals generate the modulation bias voltage or signal level. As described above, the MODBIAS signal may be the sampled quiescent signal level with respect to which the data signal levels will be established. As an alternative, the quiescent signal level or bias voltage may be established at a predetermined signal level which may be fixed for established transmitter conditions. Thus, the interface circuit 90 allows the MODBIAS signal to be obtained from a source separate from that at the terminal 16 during the quiescent state of the modulation circuit 15 shown in FIGS. 4A and B.

The analog output signal from the amplifier 35 is placed into the successive approximation register (SAR) 80', substantially in the same manner as described with respect to the SAR 80 in FIG. 3. The AD_CONV signal represents the trigger signal for the sampling of the analog signal level $V_r$ and for storing the corresponding digital value $V_r$ of the sampled signal level in the SAR 80'. The signal circuitry shown in FIG. 5B differs from the signal shaping circuit 31' described with respect to FIG. 3 in the logic manipulation to determine deviations or offset from the quiescent state bias signal level or the MODBIAS signal. Desirable modulation deviations differ at various preferred data transmission rates. The desired signal deviation level from the quiescent signal or reference level $V_r$ corresponding to the unmodulated channel frequency $F_c$ of the transmitted signal may be dynamically calibrated for desired data transmission frequencies over designated types of the transmitter 62. The calibrated deviations may differ among units of the same type of transmitter 62.

In the described embodiment, the two preferred data transmission rates are standard 4800 and 9600 baud rates. One of the respective reference values TXDEV48 and TXDEV96, as programmed after calibration into the EEPROM 101, is selectable by a selection signal DEVSEL applied via data line 178 to a digital logic multiplexing circuit 179 (2:1 MUX). The selected reference value TXDEV48 or TXDEV96 is applied to respective digital adder and subtractor circuits 45' and 49', which generate respective digital values corresponding to desired signal level variations for respective high and low bias signals with respect to the reference channel frequency or quiescent state signal level.

The generated digital values for the high and low bias values are coupled via respective data buses 183 and 184 to a quint (5:1) digital multiplexing circuit function 185 (5:1 MUX). The remaining three reference values which are coupled via respective bus lines 187, 188 and 189 to the 5:1 MUX circuit 185 are the stored values identified as RXOFFSET, CDTHRESH and B+REF. The RXOFFSET, CDTHRESH and B+REF values control DC-offset voltage compensation of the received signals, a carrier detect threshold value and a calibration value for controlling the regulated power supply, respectively.

The 5:1 MUX circuit 185 sequentially couples the five reference values to a digital-to-analog circuit 190 (DAC) in accordance with a timing cycle established by the FILTCLK1 timing sequence. A timing control circuit 191 is coupled and applies the FILTCLK1 timing signal to the 5:1 MUX circuit 185, to the DAC 190 and to each of 5 sample-and-hold circuit elements 193 through 197. The sample-and-hold circuits 193 through 197 store the respective analog (voltage level) quantities of the digital values as converted by the DAC 190. Each stored analog value remains in its respective circuit 193 through 197 until refreshed or altered by a subsequent voltage signal command by the timing circuit 191 to store an updated signal level.

The sampled MODBIAS voltage signal which is digitally stored in the SAR 80' is preferably reconverted to an analog signal by a further digital-to-analog function of circuit element 198 (DAC). The DAC 198 is in the preferred embodiment also driven by the FILTCLK1 timing signal. The analog output signal from the DAC 198 is applied via data line 199 directly to the switch 46', which illustratively comprises a quad analog multiplexing circuit (4:1 ANALOG MUX). The high and low modulation signals as stored in the sample-and-hold circuits 193 and 194, are also applied as inputs to the switch 46' via data lines 202 and 203, respectively. An amplified signal received from the receiver 60 is a fourth signal to be applied via data line 204 to the switch 46' to be selectively switched.

Analog signal equivalents of the three remaining digital reference values RXOFFSET, CDTHRESH and B+REF are applied after conversion by the DAC 190 to the sample-and-hold circuits 195, 196 and 197, respectively. It is to be realized that the voltage levels stored in the sample-and-hold circuits 195, 196 and 197 are not to be, considered as variables, but rather as level controlled reference signals in the operation of any one combination of the digital data source 30, communication interface circuit 90 and transceiver 89, as shown in FIGS. 4A and B. Once a combination of the components has been configured and has been calibrated, the reference values programmed into the EEPROM 101 are expected to remain stored therein during the working life of the data digital source 30. When the interface circuit 90 is powered down, the voltage levels at its respective sample-and-hold circuits 193–7 may disappear. However, when power is restored to the communication interface circuit 90, the analog signal levels corresponding to the respective, permanently programmed reference values would be promptly restored to the sample-and-hold circuits 195, 196 and 197, for example.

The analog voltage level signals stored in the sample-and-hold circuits 195, 196 and 197 are respectively designated as RXOFFSET, CDTHRESH and B+REF signals. The B+REF signal is preferably applied to a feedback amplifier regulator circuit 205. The output B+REGL signal from the regulator circuit 205 constitutes the control signal applied at terminal 206 for controlling external elements of a typical switched power supply circuit, the power section of which typically may be part of the transceiver 89. A typical power circuit controlled by the regulation provided by the B+REF signal may, for example, typically couple the output signal B+REGL at terminal 206 through a current limiting resistor to a base of an external power PNP pass transistor, or the output signal might be coupled through an external pullup transistor to the gate of a P-channel power MOSFET transistor.

The B+FB signal applied to terminal 207 is a feedback signal which is applied to the non-inverting input of the regulator amplifier circuit 205 to close the loop from such external elements for a feedback regulation of the B+REGL signal. The B+FB signal is applied to the amplifier circuit 205 through a voltage divider circuit 208, such that the signal level applied to the circuit 205 is one-half of the fed back signal level from the external elements of the power supply designated generally by 209. Thus, the reference value stored as B+REF in the EEPROM 101 is also one-half of the desired output voltage from the amplifier circuit 205. With the output voltage from the digital-to-analog converter circuit 190 and the sample-and-hold circuit 197 ranging from 2.0 to 5.0 volts, as a preferred example, the voltage range at the output terminal 206 and that of the power supply 209 would be at twice that level, ranging between 4.0 and 10.0 volts.

The analog signals RXOFFSET and CDTHRESH, stored at the respective sample-and-hold circuits 195 and 196 are applied as bias and reference signal levels in a signal processing function of the raw signal RXAUDIO, as will be explained with respect to FIG. 5C. A signal received from a conventional audio type FM receiver 60 of FIGS. 4A and B is preamplified and preprocessed, and is then applied as the RXAMP signal to the switch 46' shown in FIG. 5B.

In still a further reference to FIG. 5B, the switched output from the switch 46' is applied directly to the low pass filter (LPF) 47'. The LPF 47' is, in the preferred embodiment, a 6-pole, switched capacitor linear phase type low pass filter. Currently preferred characteristics for the filter element are as follows:

Pole locations: alpha+j*beta format designation

Corner frequency: 2700 hz., filterclock 50 khz.

alpha1=2404 beta1=1110 alpha2=2223 beta2=3288 alpha3=1661 beta3=5349

Corner frequency: 5400 hz., filterclock=100 khz.

alpha1=4808 beta1=2220 alpha2=4446 beta2=6577 alpha3=3322 beta3=10697

The corner frequency of the LPF 47' is desirably scalable by changing the filterclock frequency, namely the frequency of the FILTCLK1 signal. Thus, with the LPF 47' being operable under one of two preferred frequency conditions, one at a frequency twice that of the other, the FILTCLK4 signal may simply be gated in a typical signal gating manner to apply one or the other frequency to the LPF 47', in accordance with the desired frequency or speed. The LPF 47' desirably also includes a programmable signal inversion function ("RXINV"), for inverting the polarity of the filtered output signal in response to an input signal as programmed in the EEPROM 101. A normally expected signal sense condition, referred to as "mark-hold", is initiated by a high signal level moving toward low or ground. Voice message transmissions in contrast to data message transmissions typically have no signal sense requirement. Thus, for typical voice frequency transceivers 89 (FIGS. 4A and B), some commercially available types of transceivers 89 may introduce a signal sense which is inverted with respect to the normally expected signal in data message applications. The signal inversion function may be programmed into the EEPROM 101 if so determined in a prior calibration of the respective transceiver 89, the calibration determining the actual signal sense polarity of the receiver 89 and subsequent programming correcting for any inverted signal sense of the respective transceiver module. During the transmit mode of the communication interface circuit 90, the switch 46' (FIG. 5B) applies modulated and filtered data signals as modulation signal strings at a selected data rate as TXMOD signals to the modulation terminal 16. But after the interface circuit 90 is in the receive mode, the switch 46' applies filtered received data strings as FRXAUDIO signals to the data line 212. The signal RXFILT is applied to output terminal 213 through the output buffer amplifier 214. The RXFILT signal is contemplated to be a test signal only and is not further applied as a data or control signal.

FIG. 5C depicts a received signal normalization and detection circuit 250, which is connected to the receiver 60 to receive and normalize its received signal RXAUDIO. The normalization circuit 250 includes an initial signal amplification stage in the form of an adjustable gain amplifier 252 and a signal detection circuit 253 which determines the presence of a carrier signal and, in response, generates a carrier detect signal CDL at a terminal 254. The adjustable gain amplifier 252 and signal filters in the signal detection circuit 253 employ in a preferred circuit implementation a well known capacitive switching technology. The received RXAUDIO signal is normalized by the adjustable gain amplifier 252 in dependence on a number of specifically determined values which ultimately affect the output of the amplifier 252. A reference value RXGAIN may be stored in the EEPROM 101 to be applied via data bus 256 and a decode function 257 to provide a predetermined amplification scale factor. In addition, the variable gain amplifier 252 is driven by the clocking signal FILTCLK1D which has the same frequency as the FILTCLK1 signal but is phase-shifted with respect thereto. The FILTCLK1D signal is the clocking signal for the switched capacitor technology employed in the variable gain amplifier 252. It should be noted that the FILTCLK1D signal may be specifically varied by changing the reference value FILTCLK1 stored in the memory circuit 101. The gain of the amplifier 252 may consequently be adjusted by the RXGAIN value which selects for example the pattern of switched capacitors.

Another input signal applied to the adjustable gain amplifier 252 which may be configured for a specific transceiver 89 is the RXOFFSET signal. Received signal messages from transceivers and from FM radio receivers in general typically include a DC bias signal component. Since the DC bias varies among radio units, it has been found desirable to provide a unit specific offset value which may be determined during the calibration process of the transceiver 89, or may be approximated as found from classes or groups of radio transceivers. The RXOFFSET signal is applied to the variable gain amplifier 252 via line 258 to eliminate the DC bias voltage component of the RXAUDIO signal applied to the amplifier 252 via the terminal 259 from the receiver 60.

The carrier detect circuit 253 operates on the recognized principle that high frequency, open noise received by a radio is significantly reduced when a strong radio carrier signal is received, even though no modulation may be present. The carrier detect circuit 253 employs in a preferred embodiment, as an example, a series of a four-pole high pass filter (HPF) 265, a full wave rectifier circuit 266 and a low pass filter (LPF) 267. The normalized received signal RXAMP is applied to an input terminal 268 of the HPF 265. The output signal from the LPF 267 is coupled to the inverting input terminal of a comparator 269. The analog equivalent signal level of CDTHRESH stored in the sample and hold circuit 196 (shown in FIG. 5B) is coupled to the non-inverting input terminal of the comparator 269. The signal level of CDTHRESH may be determined by calibration to establish a signal switching level for the comparator 269 at which a carrier signal detection occurs reliably. Since noise characteristics and signal to open noise characteristics vary among various transceiver types, a desired threshold range adjustment between 3.5 to 5.0 volts, as may be implemented desirably by a six-bit digital resolution, is desirably supplemented by the capability of adjusting the filter elements. The four-pole HPF 265 preferably with a nominal corner frequency of 9000 hz. has preferably a scalable range of 4500 to 18000 hz. The LPF 267 has a nominal corner frequency of 500 hz. which is scalable over a preferred range of 100 to 2000 hz.

The comparator 269 preferably includes a hysteresis feedback loop 271 for adjusting the hysteresis characteristics of the carrier detect switching point. Since it may be desirable to vary the hysteresis characteristics of the comparator 269, a CDHYS reference value as stored in the EEPROM 101 may be applied via data bus 272 and a decoding function 273 to configure the feedback loop, for example by selectively switched resistive elements as controlled by the stored CDHYS value. In a preferred configuration, a four bit reference value provides the resolution in a hysteresis adjustment range between zero and 0.5 volts.

The output signal may be applied through a MOSFET switch 275 as an open drain output to the terminal 254. The carrier detect signal CDL may be disabled by grounding the terminal 254 instead of coupling it through a typical pullup resistor to B+, such as +5 volts. A carrier detect disable or defeat function is illustrated by the CD DEFEAT circuit 277. The level on the CDL terminal 254 may be sampled and latched when the RADION signal is driven high by a typical flip-flop function of the circuit 277. The entire signal detection circuit 253 may be powered down if the CDL signal is at ground at that time.

Figure 5D:
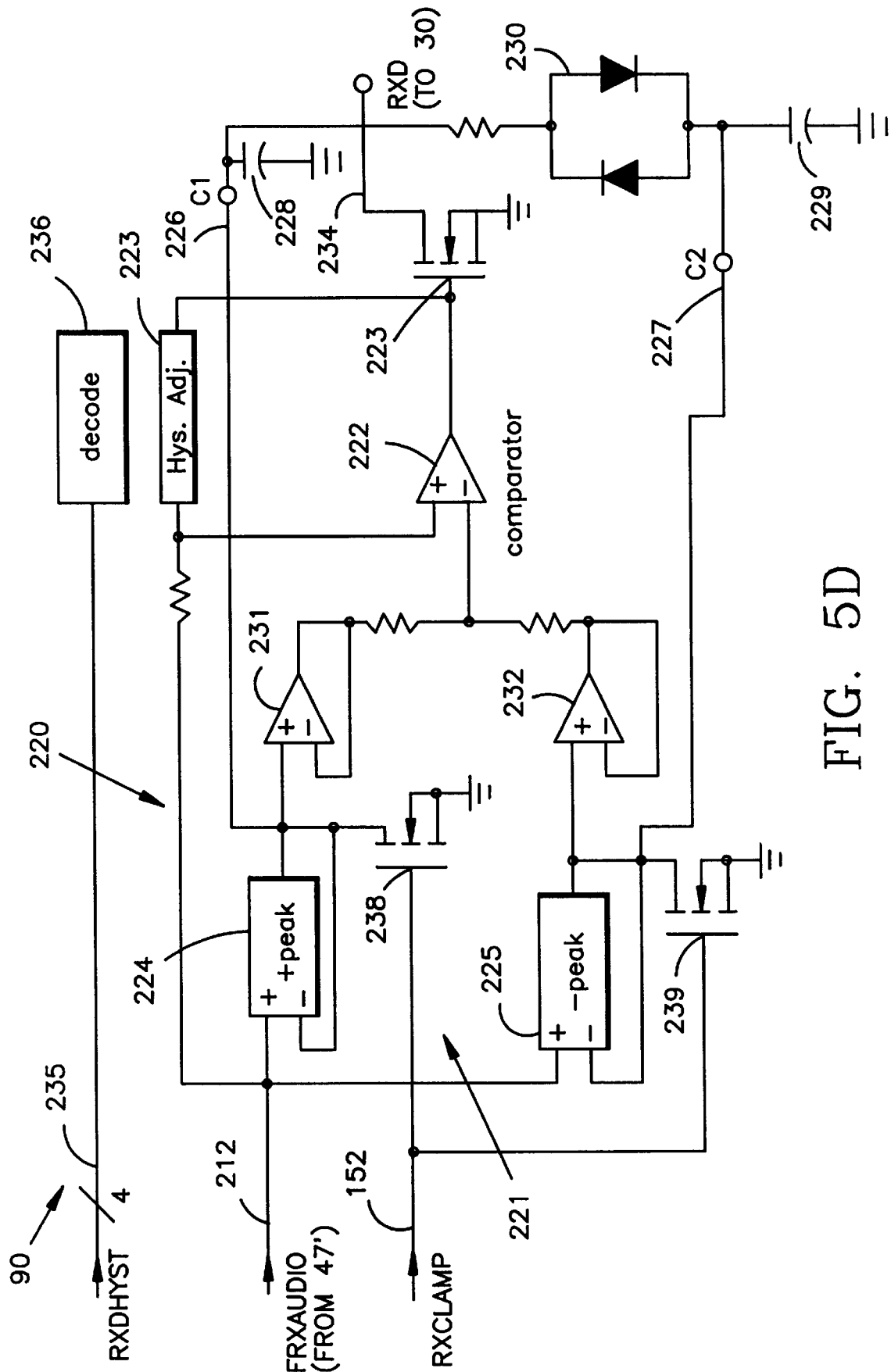

In reference to FIG. 5D, the FRXAUDIO signal is applied to a signal processing circuit designated generally by the numeral 220. As described above the output RXAUDIO from the receiver 60 of FIGS. 4A and B is normalized by the adjustable gain amplifier 252 of FIG. 5C before being applied to the switch 46' of FIG. 5D; after being gated by the switch 46' of FIG. 5B, it is applied to the LPF 47', which outputs the processed audio signal FRXAUDIO. The signal processing circuit 220 includes a peak to peak detector circuit 221 which establishes, generally described, an average signal level between successive peaks. A comparator circuit 222 compares the applied signal with respect to the determined average between peaks and establishes high or low signal levels with respect thereto. Signal hysteresis is modified by a hysteresis adjusting feed back circuit 223 of the comparator circuit 222. High and low peak voltages are detected by respective peak detectors 224 and 225 of the processed audio signal FRXAUDIO applied thereto, are applied to terminals 226 and 227 which in turn are coupled to respective external capacitors 228 and 229 for storing the detected peak voltages. An external back-to-back diode and resistor network 230 may be coupled between the two external capacitors 228 and 229 to shape the stored peak voltages with respect to each other. The detected peaks are applied through buffer amplifiers 231 and 232 to the negative input terminal of the comparator circuit 222. The output from the comparator circuit 222 drives the gate of a MOSFET transistor switch 233. The output of the MOSFET transistor switch 233 at the terminal 234 constitutes a received, normalized digital audio signal RXD, which may be received by the digital data source 30 as a signal input for example.

Because of variations in signal output characteristics among various transceivers 89, the optimization of signal switching makes an adjustable hysteresis correction desirable. For example, a combination of feedback resistors of the comparator circuit 222 may be selectively switched into or out of the feedback loop to provide a programmably variable hysteresis adjustment. In calibrating the output signal RXD at the terminal 234 to a test signal, an optimum impedance value for the hysteresis adjustment may be determined. A determined reference value RXDHYS may then be stored in the EEPROM 101. The stored reference value RXDHYS may be applied, for example, through a data bus 235 to a decode circuit function 236 (DECODE), which may gate, for example, resistive impedances, such as by transistor switches. In the described embodiment a four-bit binary resolution of a preferred hysteresis voltage range between zero and 0.5 volts may be programmed.

Transmitted noise at the conclusion of a transmit cycle may cause the peak-to-peak detector circuit 221 to overload and fail to initialize processing the received FRXAUDIO signals. The RXCLAMP signal is applied via data line 152 to respective switches 238 and 239 to clamp the detected peak signals at the initiation of the receive mode to ground. The length of the RXCLAMP signal from the end of the transmit cycle into the beginning of the receive cycle is programmed in accordance with the transmitted noise characteristics of the selected receiver 60, thereby enabling the communication interface circuit 90 to interface with a variety of receivers 60 with a range of noise characteristics.

The foregoing is a description of preferred circuit elements and functions for interfacing a digital data source with any of a number of analog data transmission devices, such as the referred to transceiver 89. It is understood that at least some of the described relationships and considerations apply to transmitters apart from receiver sections, and likewise to radio receivers apart from transmitter sections. It is further understood that the described relationships and considerations apply to the transmission of data from any type of data source independently or in the absence of the referred to data terminal.

Wideband VCOs such as that VCO 66, which is stabilized by the synthesizer circuit 78 as shown in FIG. 4A, are commonly used to generate frequencies across a broad frequency range. The modulation sensitivity of the VCO 66, i.e., the frequency shift of the output signal for a given voltage shift of the input signal, typically varies as a function of the set frequency within the frequency range. In FIG. 3, a single offset voltage is set into each of the adder circuit 45 and the subtractor circuit 49, which respectively sums and subtracts the captured DC reference voltage Vr to provide a modulation input to its VCO 66 (as shown in FIG. 4A). The use of a single, fixed offset voltage may not provide satisfactory modulation accuracy at all frequencies across the broad frequency range of interest.

Figure 8:
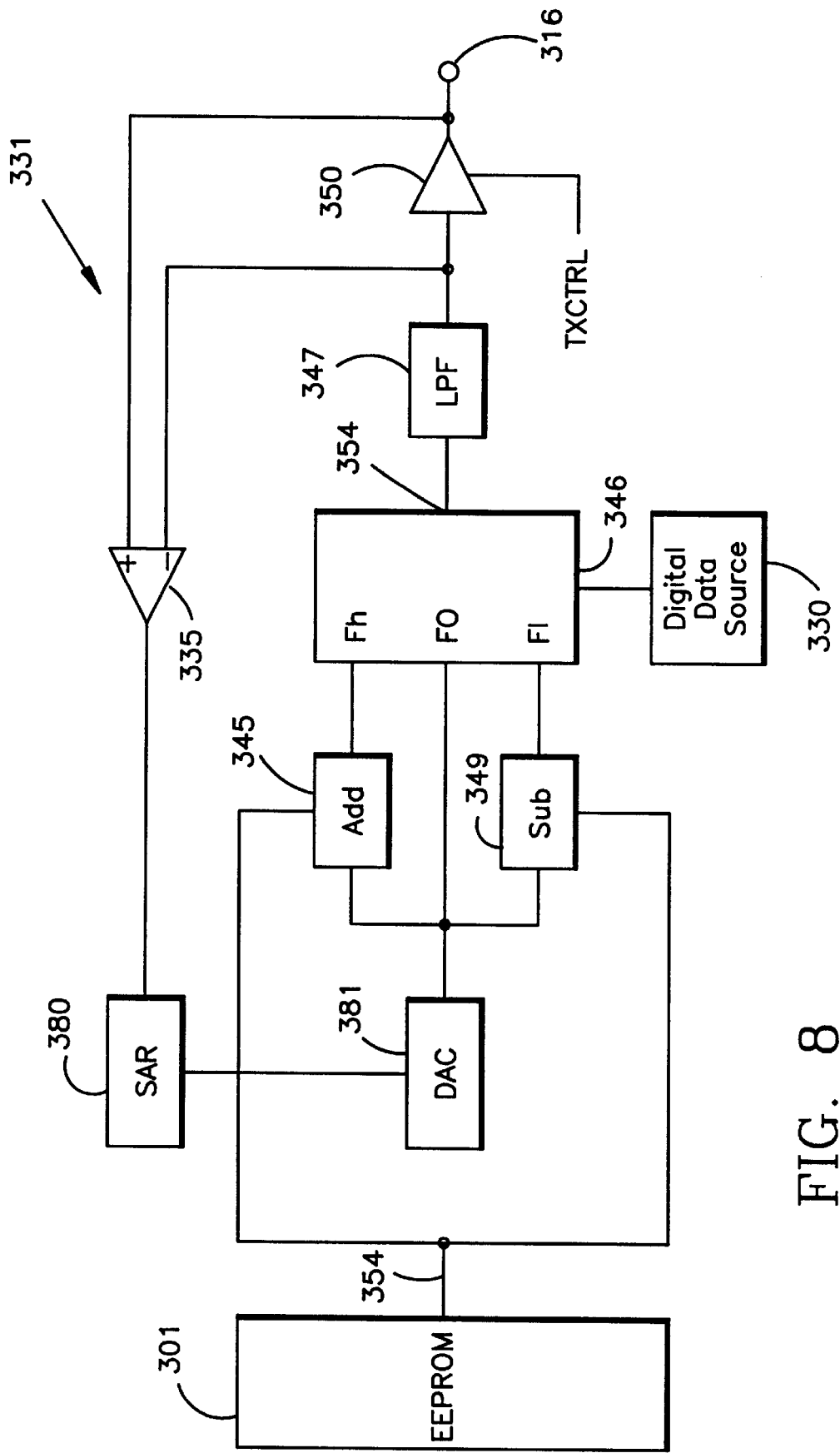
FIG. 8 is a schematic diagram of a further, programed embodiment of the shaping circuit shown in FIGS. 3 and 4A and B.

A shaping circuit 331, which is similar to the circuit 31 of FIG. 3, is shown in FIG. 8, wherein like elements are identified by similar numbers but in the 300 series. A table of modulation offset coefficients as determined at regular frequency intervals across the range of interest is stored in the EEPROM 301. During initialization when the operating frequency is set, the microprocessor 70 addresses the EEPROM 301 based upon the determined operating frequency to obtain and load the corresponding modulation coefficient into the adder circuit 345 and the subtractor circuit 349. It is appreciated that the center frequency $F_c$ of the modulation output appearing on the output port 66c of the VCO 66 could be read under the control of the microprocessor 70 (FIGS. 4A and B) and used as an address to the EEPROM 101 to download the desired modulation coefficients or offsets. Alternatively, the microprocessor 70 can calculate the center frequency $F_c$ based upon the programmable factors R and N (as addressed from the EEPROM 101) and the fixed, known frequency of the reference oscillator as will be explained below with respect to FIG. 10A. Thus the modulation shift and sensitivity is maintained constant across the frequency band of interest. The number of coefficients stored within the EEPROM 301 must be sufficient to provide a piece wise approximation of the modulation sensitivity within the modulation accuracy limits. In a further embodiment of this invention, the closest adjacent modulation coefficients for the operating frequency can be accessed from the EEPROM 301 and processed by an interpolation circuit (not shown) to derive an interpolated modulation coefficient. The use of the LPF 347 in the shaping circuit 331 of FIG. 8 (as well as similar filters in FIGS. 11 and 13) is optional. If the LPF 347 is removed, the modulation is FSK. If the LPF 347 is inserted, the modulation is continuous phase (CPFM).

Figure 9A:
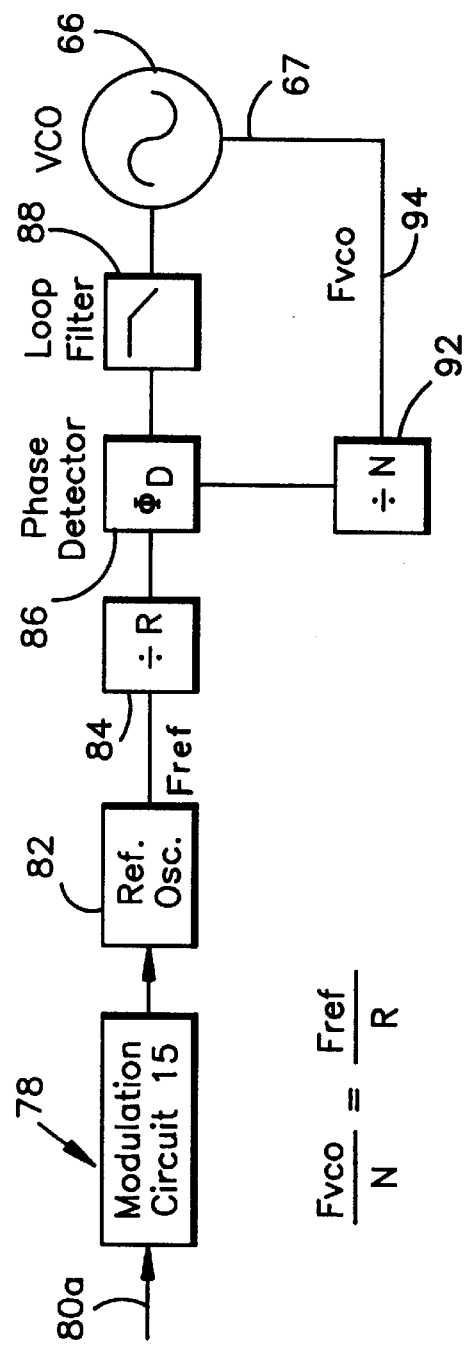
FIGS. 9A and B are respectively a schematic diagram of a single port embodiment of the synthesizer circuit shown generally in FIG. 4A and a graphical representation of the modulation response thereof.

The synthesizer circuit 78 shown generally in FIG. 4A is more fully shown in FIG. 9A. A VCO 66 without such a synthesizer circuit 78 would be unstabilized in that the center frequency $F_c$ of the output of the VCO 66 would drift or vary. This would be unacceptable in most communication applications, where the operating frequency or range is government regulated. As shown in FIG. 9A, the center frequency $F_c"$ of the output from the VCO 66 is stabilized by connecting it in a phase locked loop to a narrowband reference, such as a crystal reference oscillator 82. The embodiment of the synthesizer 78 shown in FIG. 9A is a single port synthesizer, meaning that the input modulation as derived from the output of the shaping circuit 31' (FIGS. 3 and 4A and B) is inputted via a single input or port, namely the first input 80a, and the modulation circuit 15 to the reference oscillator 82. The oscillator 82 outputs a signal of a fixed or reference frequency Fref to a divide-by-R circuit 84, which divides as its name implies the reference frequency Fref by the known number R. A phase detector 86 receives the divided-by-R output of the circuit 84 and the feedback from the output 66c of the VCO 66 via the conductor 94 and a divide-by-N circuit 92. The phase detector 86 compares the phase of the outputs from the circuits 84 and 92 to apply a phase error signal to a loop filter 88. The output of the filter 88 is applied to the input of the VCO 66. Thus the frequency $F_c$ of the VCO output 66c is a function of Fref×N/R. Since the output frequency Fref of the reference oscillator 82 is quite stable, the phase lock loop as shown in FIG. 9A also keeps the output frequency $F_c$ of the VCO 66 stable.

Figure 9B:
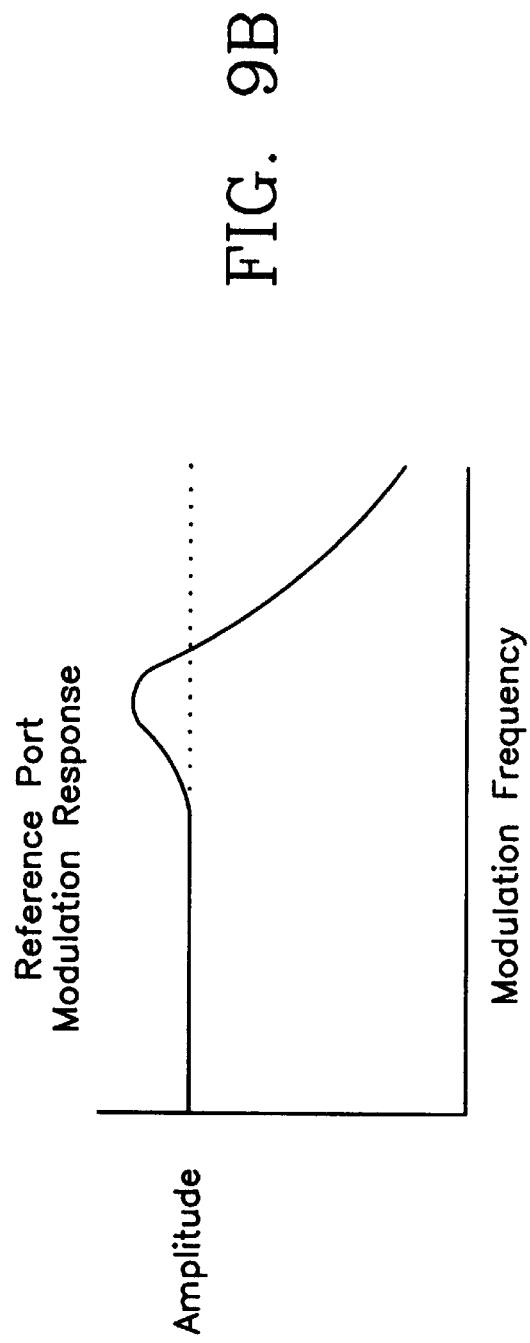

The single port synthesizer 78 shown in FIG. 9A exhibits a modulation response that has a low pass frequency response as shown in FIG. 9B, which shows the amplitude deviation of the output 66c of the synthesizer 78 as a function of the frequency of the input modulation. The characteristics of the modulation response are set by the closed loop transfer function of the phased locked loop shown in FIG. 9A. Second order responses are commonly employed for loop stability. The second order response shown above has a low pass cutoff at the loop natural frequency $\omega_n$ times the square root of two. Generally, modulation must be bandlimited to 70% of the frequency $\omega_n$ to avoid amplitude and phase distortion of the modulation, effectively limiting the data rate for the synthesizer 78 of a given $\omega_n$. The single port synthesizer 78 of FIG. 9A is only capable of effectively FM modulating input signals or modulation of relatively low frequency or data rate. In other words, the synthesizer 78 of FIG. 9A is unable to respond to input signals of relatively high data rate to shift the frequency of the VCO output 67.

Figure 10A:
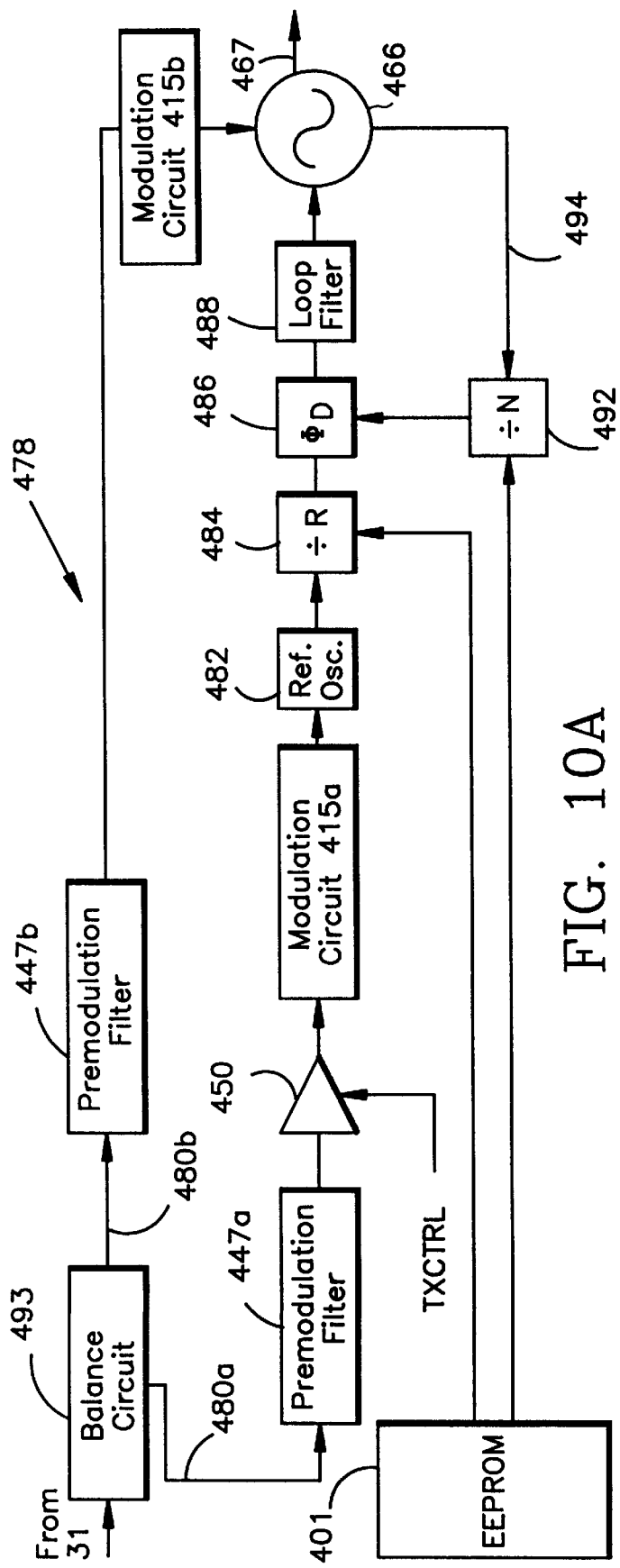
FIGS. 10A and B are respectively a schematic diagram of a two port embodiment of the synthesizer circuit shown in FIG. 9A and a graphical representation of the modulation response thereof.

A dual port synthesizer 478 similar to the single port synthesizer 78 of FIG. 9A is illustrated in FIG. 10A, wherein like elements are identified by similar numbers but in the 400 series. The dual port synthesizer 478 has the advantage over the single port synthesizer 78 of FIG. 9A in that the synthesizer 478 has a modulation response as shown in FIG. 9B which permits modulation at frequencies well above the natural loop frequency $\omega_n$ of the synthesizer 478. The modulation input is derived from the shaping circuit 31' (FIGS. 3 and 4A and B) and is applied to a balance circuit 493, which divides and applies a part of the input modulation to the first or reference modulation port 480a and a part thereof to a second or VCO modulation port 480b. The balance circuit 493, as is well known in the art, comprises a potentiometer having a first terminal connected to receive the input modulation and a second terminal connected to ground. The first terminal is connected to the first port 480a and a wiper of the potentiometer is connected to the second port 480b, whereby the portion of the input modulation applied to the second port 480b is dependent on the wiper position. The first portion of the input modulation appearing on the reference modulation port 480a is applied via a first premodulation filter 447a to the switch 450 in the form of a tristate buffer, and the second portion to a second premodulation filter 447b. The first and second premodulation filters 447a and b, and the switch 450 perform the same functions as do the filter (LPF) 47 and switch 50 in the shaping circuit 31' of FIGS. 3 and 5B. When the control signal TXCTRL renders the switch 450 closed, the output of the filter 447a is applied via the modulation circuit 415a to the phase locked loop which comprises as described above with respect to FIG. 9A the reference oscillator 482, the divide-by-R circuit 484, the phase detector 486 and the loop filter 488.

Figure 10B:
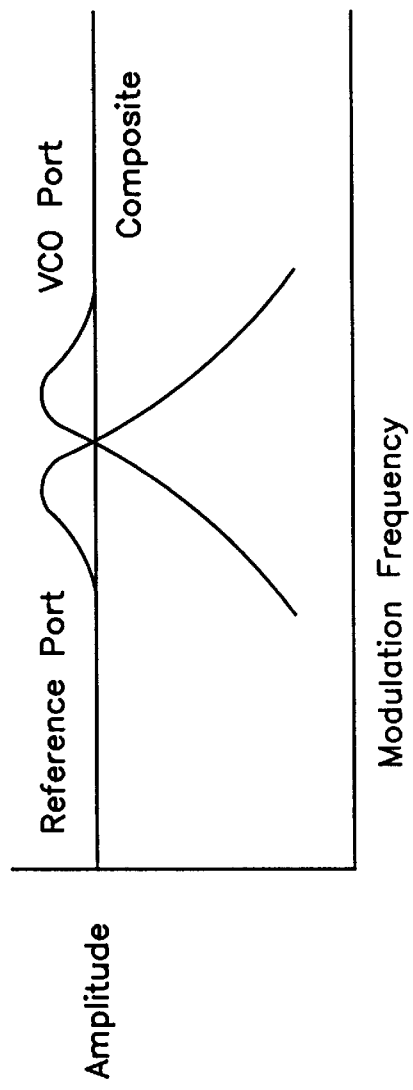

As shown in FIG. 10B, the modulation response for that input modulation applied to the reference modulation port 480a is a low pass response as explained above with respect to FIGS. 9A and B. The response for VCO modulation, i.e., the response of the modulation input applied to the VCO modulation port 480b, is a high pass response, which is mirrored with respect to the low pass response of the reference port modulation on the modulation frequency axis of FIG. 10B. The vector sum of the low and high frequency responses (amplitude and phase) provides a composite frequency response that is flat and introduces no phase distortion. Such dual port modulation allows modulation at frequencies well beyond the loop natural frequency $\omega_n$ and achieves modulation frequency characteristics to be independent of the loop natural frequency $\omega_n$. The balance circuit 493 allows the modulation levels applied to each of the frequency modulation port 480a and the VCO modulation port 480b to be set independently of each other to compensate for differences in modulation sensitivity. The phase relationship between the modulation input applied to reference modulation port 480a and the VCO modulation import 480b must be preserved so that the composite modulation response remains flat.

Further, dual port modulation as achieved by the synthesizer circuit of FIG. 10A permits modulation at frequencies higher than that of the loop natural frequency $\omega_n$, which permits the performance of the dual port synthesizer circuit 478 to be optimized without compromising for modulation frequency response or other characteristics such as channel switching time or the presence of noise and spurious components. As shown in FIG. 10A, such optimization is carried out by down loading values of N and R from the EEPROM 401 to the corresponding circuits 484 and 492.

Figure 11:
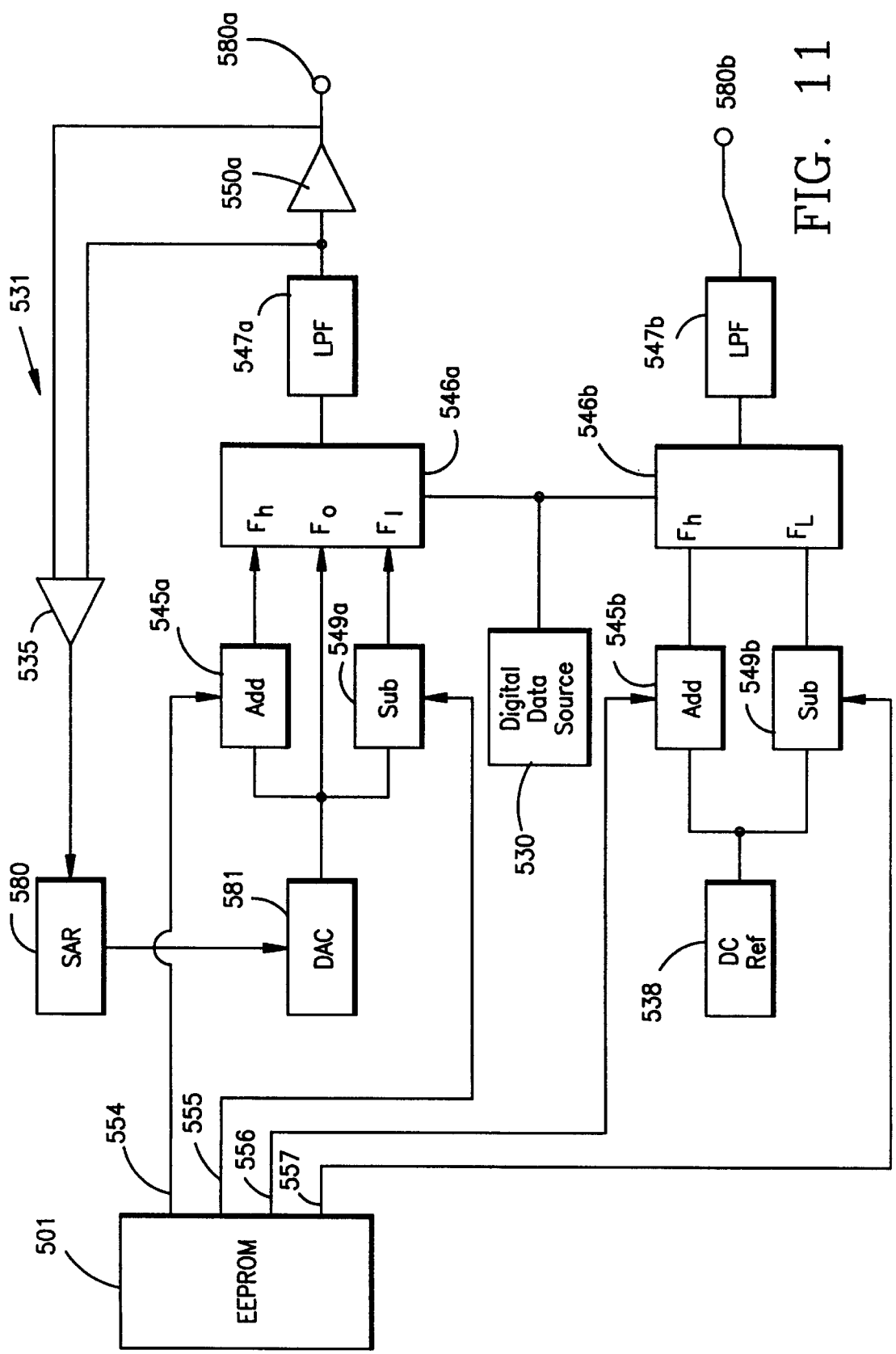
FIG. 11 is an alternative embodiment of the shaping circuit shown in FIG. 3 adapted for apportioning and applying the input modulation between a reference modulation port and a voltage controlled oscillator modulation port of the synthesized circuit shown in FIG. 10A.

A shaping circuit 531, which is a further embodiment of the shaping circuits 31' and 331 as shown respectively in FIGS. 3 and 8, is shown in FIG. 11, where similar elements are identified by like numbers except in the 500 series. The shaping circuit 531 is configured to provide a reference modulation output 580a and a VCO modulation output 580b, which are respectively connected to the reference modulation input 480a and the VCO modulation input 480b of the synthesizer 478 of FIG. 10A without the need for the balance circuit 493 thereof. In the embodiment of FIG. 11, the DC bias appearing at the reference modulation input 480a is sampled by opening the switch 550a and storing the sample in digital form in the SAR 580. The reference modulation output is obtained by adding in adder circuit 545a and subtracting in the subtracting circuit 549a the stored sample or offset as the digital data source 530 applies a stream of one and zero signals to the switch 546a. The VCO modulation is obtained by adding in adder circuit 545b and subtracting in subtracting circuit 549b a fixed DC voltage derived from a DC reference circuit 538 as zeros and ones outputted from the digital data source 530 respectively throw the switch 546b to their Fh and Fl states thus coupling the circuits 549b and 549b thereto. In its Fo state, the switch 546b outputs the DC voltage derived from the DC reference circuit 538 so that no separate switch need be connected to the switch 546b through the LPF 547b. By contrast when the switch 546a is in its Fo state, its switch 550a is opened to present a high impedance to the reference modulation input 580a. Significantly, each set of reference modulation and VCO modulation offsets may be separately programmed and downloaded from the EEPROM 501 to set the portion of the modulation output applied to the reference modulation input 580a and that portion applied to the VCO reference modulation input 580b, thus implementing the functions of the balance circuit 493 shown in FIG. 10A. Further, the separate programming of the reference modulation and VCO modulation offsets enables the independent compensation for any differences in modulation sensitivity across the tuning range for both of the modulation inputs 580a and b, by programming different offsets at different operating frequencies.

A synthesizer circuit 631a, which is an alternative embodiment of the synthesizer circuits 78 of FIGS. 4A and 9A, and 478 of FIG. 10A, is shown in FIG. 12A, wherein similar elements are identified by like numerals but in the 600 series. The synthesizer circuit 631a employs an open circuit technique meaning that its closed loop is opened when a switch 687a, which takes the form of a tri-state buffer and is inserted in the loop, is rendered non-conductive. Without the switch 687a, the synthesizer circuit 631a (and the synthesizer circuits 78 and 478 of FIGS. 9A and 10A respectively) would operate in a closed loop mode wherein it is phased locked to the reference oscillator 682a.

In the closed loop mode, the second order loop response is determined by the loop gain and the impedance values of the resistors R1 and R2 and the capacitor Cl, which form the lead lag, loop filter 688a. The VC6 666a can be considered to operate as a perfect integrator. The resistors R3 and R4, and the capacitors C2 and C3 provide added filtering to attenuate spurious components at the reference frequency Fref set by the reference oscillator 682a. The corner frequencies of these additional poles of filtering are sufficiently high in frequency to avoid significantly influencing the second order response of the closed loop.

The synthesizer circuit 631a of FIG. 12A is of the single port type, meaning that input modulation is input at one terminal or port formed within the loop filter 688a. When the switch 687a is closed, the loop stabilizes at its relatively constant loop frequency $\omega_n$. When the switch 687a is opened, the loop frequency $\omega_n$ begins to drift, albeit at a slow rate. When a signal is to be transmitted, the associated shaping circuit 31' (FIG. 3 or 8) captures the control voltage within the loop filter 688a and superimposes it on the input modulation derived from the shaping circuit 31' (FIGS. 3 and 4a). Then the switch 687a is opened and the captured control voltage and modulation input are applied to the VCO 666a. The captured control voltage and modulation are inserted within the loop filter 688a. Normally, with the loop closed, modulation applied at this point would be subject to the high pass frequency characteristic of VCO modulation. This is, of course, inappropriate if a low frequency modulation response flat to DC is required. With the loop open, the second order high pass response is eliminated, and a lowpass response determined by the added poles in the loop filter (R3,C2,R4,C3) is obtained. This low pass response is generally substantially wider than the closed loop low pass response attained when single port, reference oscillator modulation is used, allowing much higher signalling rates in this embodiment of FIG. 12A without using two port modulation. Higher frequency response can be obtained by reinserting the switch 687a between the resistor R4 and the VCO 666a in FIG. 12A.

Loop drift renders the synthesizer circuit 631a unsuitable for transmission of continuous or long strings of digital data. Rather, this open loop mode of modulation is applicable to relatively short transmissions of data bursts which are limited to some maximum number of bits. That maximum number of bits depends on the drift characteristic of the synthesizer circuit 631a and the maximum allowable system frequency error. In open loop operation, the VCO 666a responds to any change in the amplitude of the voltage applied at its tuning port 66b in accordance with its gain characteristic. Commonly used VCO's in these applications have VCO gains $K_v$ on the order of 10 MHz/V or more, meaning that a 1 volt change in voltage at the control line will result in a 10 MHz shift in VCO output frequency. In order to achieve FM deviation levels $f_d$, of ±2.4 KHz, as might be used at 9500 bits per second signalling rates, small changes in voltage of +/−240 μV would be required. These small deviations are characteristic of low data rate, narrowband communications systems. In a higher signalling rate system, for example a 1M bit/sec system using $f_d$, of ±250 KHz, a larger offset of +/−250 mV would be used.

FIG. 12B shows a synthesizer circuit 631b, which is an alternative embodiment of the circuit 631a of FIG. 12A and also operates in an open loop mode. The synthesizer circuit 631b differs from the circuit 631a by replacing its switch 678a with a track and hold (T/H) circuit 687b. A further difference is that the output of the modulation circuit 615b is connected to a separate, input port 66a of the VCO 666b.

In the synthesizer circuit 631a, the insertion of the modulation directly into the loop filter 688a required that the amplitude of the voltage offsets (as added and subtracted by the circuits 45 and 49) be relatively small; as a result, the resolution of the DAC 81 would need to be increased and the time required by the loop filter 688a to capture the loop control voltage would also need to be increased. Additionally, the small voltage offsets required for narrowband communications, may be of similar magnitude to noise levels generated in the communication interface circuit 90. The synthesizer circuit 631b of FIG. 12B overcomes these problems and, further, is more appropriate where low FM modulation indices are required.

The operation of the synthesizer circuit 631b is similar to that of the synthesizer circuit 631a. Normally, the T/H 687b is set in its track state, wherein the phase lock loop remains closed and the loop frequency $\omega_n$ stable. To initiate digital data transmission from the transmitter 62, the microprocessor 70 causes a transmit signal to be applied via conductor 613 to the modulation circuit 615, which responds to and captures the DC voltage at the modulation input port 66a to the VCO 666b. When the DC voltage has been captured, a control signal is applied to the T/H 687b setting it to its hold state, wherein the T/H 687b opens the phase lock loop while continuing to apply the correct control voltage (as tracked and stored during the track state) via the loop filter 688b to the VCO 666b thus maintaining the VCO's center operating frequency $F_c$. The separate input modulation port 66a on the VCO 666b has a much lower modulation sensitivity than that the tuning port 66b of the VCO 666a in the embodiment of FIG. 12A, thus reducing the effects of noise and reducing the DAC resolution requirements.

Figure 13:
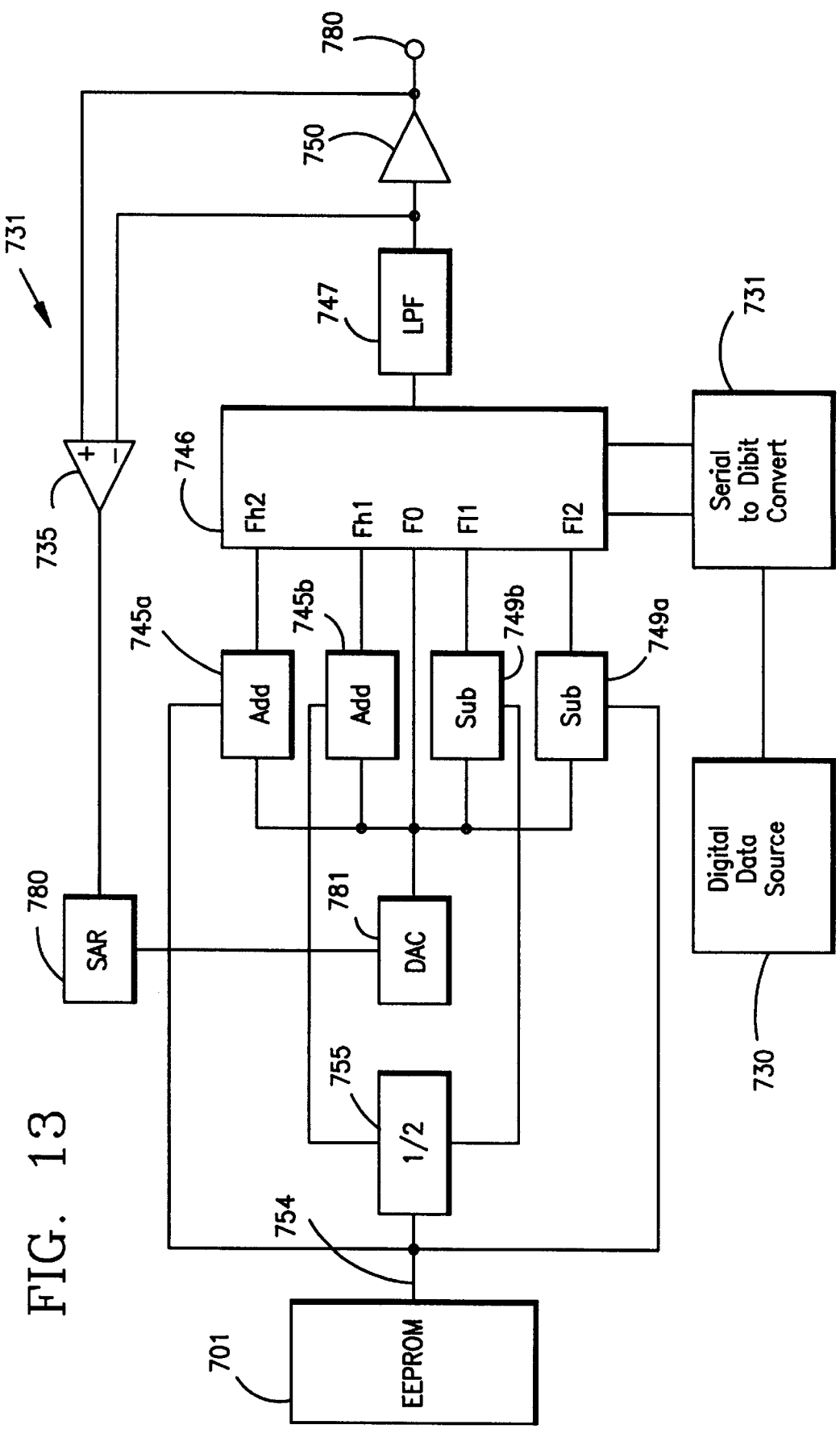
FIG. 13 is an alternative embodiment of the shaping circuits shown in FIGS. 3, 8 and 11 as adapted for multilevel modulation.

A further shaping circuit 731 particularly adapted for 4 level FM or FSK modulation is shown in FIG. 13, wherein similar elements are identified by like numerals but in the 700 series. It is appreciated that the shaping circuit 731 may be adapted for arbitrary m-ary modulation, where m=2, 3, 4 etc. Four level FM or FSK modulation provides twice the signaling or transmission rate as binary or 2 level FM or FSK modulation while achieving minimal signal to noise degradation. The digital data derived from the data source 730 is in the well known binary form of zeros and ones, and is processed by a converter 731 into a dibit format, which comprises 4 states or levels, i.e., Fh2, Fh1, Fl1 and Fl2 as shown in FIG. 13. The dibit convertor 731 captures the serial data in groups of two. After the second bit of serial data has stabilized, the convertor 731 outputs two bits of digital data, corresponding to the four possible combinations of the two serial data bits, to the switch 746, which generates one of the four levels Fh2, Fh1, etc. The dibit convertor 731 maintains the current output state until two more bits of serial data have been clocked in, then switches its output in accordance with the values of the new bits. The dibit data outputted by the converter 731 is applied to the switch 746, which in this embodiment takes the form of a one of four multiplexor. A table of modulation offset voltages are stored in the EEPROM 701 in a manner described above with respect to the shaping circuit 331 of FIG. 8. In particular, the offset voltage corresponding to the Fh2 and Fl2 states of the switch 746 is downloaded from the EEPROM 731 into the adder circuit 745a and the subtracting circuit 749a. The offset voltage for the Fh1 and Fl1 states is derived by dividing in a divider circuit 755 the offset voltage for the Fh2 and Fl2 states by a given factor, e.g., 2, and applying the divided value to the adder circuit 745b and the subtracting circuit 749b. The resulting output from the switch 746 is in the dibit format, namely comprising four voltage levels corresponding to 4 deviation levels from the FM modulator.

Various other changes and modifications in the structure of the described embodiments are possible without departing from the spirit and scope of the invention which is sought to be defined by the following claims.

We claim:

1. Programmable apparatus for generating a frequency modulated signal at a selected center frequency in accordance with digital data of at least first and second data levels, said apparatus comprising:
   a) a modulator having an input and an output and being responsive to an input modulation signal applied to its input for generating at its output the frequency modulated signal at a center frequency dependent on a quiescent voltage appearing at its input;
   b) a circuit for sampling and storing a value of the quiescent voltage in a register;
   c) an addressable memory for storing a plurality of offsets;
   d) a programmable adder for adding a downloaded offset voltage to the stored value of the quiescent voltage to output a high modulation voltage;
   e) a programmable subtractor for subtracting a downloaded offset voltage from the stored value of the quiescent voltage to provide a low modulation voltage;
   f) a controller for addressing in accordance with a data transmission parameter said addressable memory and for downloading a corresponding offset to said adder and said subtractor; and
   g) a switch coupled to said subtractor and adder and to receive the digital data for generating and applying to said input of said modulator the input modulation signal comprising a sequence of the high and low modulation voltages in accordance respectively with the first and second data levels of the digital data.

2. The programmable frequency modulated signal generating apparatus as claimed in claim 1, wherein said frequency modulated signal generating apparatus is adapted for multi-level modulation and comprises a converter for converting the digital data into a matching binary format, an offset reducing circuit, said programmable adder comprising at least first and second adding circuits, said programmable subtractor comprising at least first and second subtracting circuits, said controller addressing said addressable memory for downloading the corresponding offset to each of said first adding and subtracting circuits and to said offset reducing circuit, said offset reducing circuit reducing the amplitude of said downloaded offset and applying said reduced amplitude offset to each of said second adding and subtracting circuits.

3. The programmable frequency modulated signal generating apparatus as claimed in claim 1, wherein said frequency modulated signal generating apparatus is adapted for m-ary modulation, where $m=n^2$ and n is any whole number, said frequency modulated signal generating apparatus further comprising an adaptor for converting the digital data into a binary format corresponding to said m-ary modulation, said adder comprising m adding circuits, said subtractor comprising m subtracting circuits, an offset reducing circuit, said controller addressing said addressable storing memory for downloading the corresponding offset to one of said adding circuits, to one of said subtracting circuits and to said offset reducing circuit, said offset reducing circuit reducing the amplitude of said downloaded offset and applying said reduced amplitude offset to another of said adding and subtract circuits.

4. The programmable frequency modulated signal generating apparatus as claimed in claim 1, wherein said modulator operates at a selected frequency, and said data transmission parameter is the selected frequency.

5. The programmable frequency modulated signal generating apparatus as claimed in claim 1, wherein the digital data is transmitted at a selected baud rate, and said data transmission parameter is the selected baud rate.

6. Apparatus for generating a frequency modulated signal at a stable center frequency in accordance with digital data, said apparatus comprising:
   a) a voltage controlled oscillator having an input and an output, and being responsive to an input modulation signal for generating the frequency modulation signal at a stable center frequency at said output of said voltage controlled oscillator;
   b) a phase lock loop interconnected between said input and said output of said voltage controlled oscillator and comprising a reference oscillator for generating at its output a reference frequency signal, a phase detector connected to said reference oscillator output and to said voltage controlled oscillator output for receiving the reference frequency signal and the frequency modulated signal and for providing at its output a signal indicative of the phase difference signal and applying a filtered signal to said input of said voltage controlled oscillator, whereby the center frequency is stabilized; and
   c) a source for providing the input modulation signal as a sequence of high and low modulation level signals in accordance with the digital data and for inserting the input modulation signal into said phase lock loop, said source comprises a switch inserted into said phase lock loop and operable between a closed state for completing said phase lock loop and an open state for interrupting said phase lock loop.

7. The frequency modulated signal generating apparatus as claimed in claim 6, wherein said source further comprises a circuit operable when said switch is in its closed state for capturing a control voltage appearing in said phase lock loop and when said switch is in its open state for superimposing the input modulation signal on the captured control voltage and applying same to said voltage controlled oscillator input.

8. Apparatus for generating a frequency modulated signal at a stable center frequency in accordance with digital data, said apparatus comprising:
   a) a voltage controlled oscillator having an input and an output, and being responsive to an input modulation signal applied to its input for generating at its output the frequency modulation signal at the stable center frequency;
   b) a phase lock loop interconnected between said input and said output of said voltage controlled oscillator and comprising a reference oscillator for generating at its output a reference frequency signal, a phase detector connected to said reference oscillator output and to said voltage controlled oscillator output for receiving the reference frequency signal and the frequency modulated signal and for providing at its output a signal indicative of the phase difference therebetween, and a filter coupled to said phase detector for filtering the phase difference signal and applying a filtered signal to said input of said voltage controlled oscillator, whereby the center frequency is stabilized;
   c) a source for providing the input modulation signal as a sequence of high and low modulation level signals in accordance with the digital data and for inserting the input modulation signal into said phase lock loop; and
   d) a track and hold circuit coupled within said phase lock loop and operable in a track mode wherein said phase lock loop is maintained closed and a control voltage applied to said first input of said voltage controlled oscillator is sampled and stored, and a hold state wherein said phase lock loop is opened and the stored sample of the controlled voltage is applied to said input of said voltage oscillator to maintain the center frequency of the frequency modulation signal at its center frequency.

9. The frequency modulated signal generating apparatus as claimed in claim 8, wherein said voltage controlled oscillator has a second input forming a voltage controlled oscillator modulation port, and said source is coupled to said voltage controlled oscillator modulation port for applying the input modulation signal thereto.

10. Apparatus for generating a frequency modulated signal at a stable center frequency in accordance with digital data, said apparatus comprising:
   a) a voltage controlled oscillator having a first input serving as a reference modulation port, a second input serving as a voltage controlled oscillator port and an output, and being responsive to an input modulation signal applied for generating at its output the frequency modulation signal at the stable center frequency;
   b) a phase lock loop interconnected between said input and said output of said voltage controlled oscillator and comprising a reference oscillator for generating at its output a reference frequency signal, a phase detector connected to said reference oscillator output and to said output of said voltage controlled oscillator for receiving the reference frequency signal and the frequency modulated signal and for providing at its output a signal indicative of the phase difference therebetween, and a filter coupled to said phase detector for filtering the phase difference signal and applying at its output filtered signal to said input of said voltage controlled oscillator, whereby the center frequency is stabilized;
   c) a source for providing the input modulation signal as sequence of high and low modulation level signals in accordance with the digital data and for inserting the input modulation signal into said phase lock loop; and
   d) a balancing circuit coupled to said source for receiving and apportioning the input modulation signal into a first portion applied to said reference modulation port and a second portion applied to said voltage controlled oscillator modulation port, said balancing circuit apportioning said first and second portions independently of each other based upon a data transmission parameter, whereby the frequency modulation signal may be adjusted to account for variation in the modulation sensitivity over a range of the data transmission parameter.

11. The frequency modulated signal generating apparatus as claimed in claim 10, wherein the digital data comprise at least first and second data levels, and the frequency modulated signal is generated on said voltage controlled oscillator output at a center frequency dependent on a quiescent voltage appearing at said voltage controlled oscillator input, and said balancing circuit comprises:
   a) a reference modulation shaping circuit and a voltage controlled oscillator modulation signal shaping circuit, each of said shaping circuits comprising an output, a programmable adder for adding a downloaded offset voltage to a reference voltage to output a high modulation voltage, a programmable subtractor for subtracting a downloaded offset voltage from the reference voltage to provide a low modulation voltage, and a switch coupled to said subtractor and adder to receive the digital data for generating and applying to its output a corresponding one of a voltage reference or a voltage controlled oscillator modulation input signal, each comprising a sequence of high and low modulation voltages in accordance with the first and second data levels of the digital data;
   b) an addressable memory for storing a plurality of offsets;
   c) said reference modulation shaping circuit comprising a switch for sampling and storing in a register a value of the quiescent voltage as said reference voltage of said reference modulation shaping circuit; and
   d) a controller for addressing said addressable storing memory and for downloading first and second sets of offsets into said adder and said subtractor of each of said reference modulation shaping circuit and said voltage controlled oscillator modulation shaping circuit respectively, the values of said first and second sets of offsets being selected to determine the first and second portions of said input modulation signal.

12. Apparatus for generating a frequency modulated signal at a stable center frequency in accordance with digital data, the digital data comprises at least first and second data levels, said apparatus comprising:
   a) a voltage controlled oscillator having an input forming a modulation port and an output, and being responsive to an input modulation signal for generating the frequency modulation signal at the stable center frequency at said output of said voltage controlled oscillator;
   b) a phase lock loop interconnected between said input and said output of said voltage controlled oscillator and comprising a reference oscillator having an output for generating a reference frequency signal at said output of said reference oscillator, a phase detector connected to said output of said reference oscillator and to said output of said voltage controlled oscillator for receiving the reference frequency signal and the frequency modulated signal and for providing at its output a signal indicative of the phase difference therebetween, and a filter coupled to said phase detector for filtering the phase difference signal and applying a filtered signal to said input of said voltage controlled oscillator, whereby the center frequency is stabilized;
   c) a source for providing the input modulation signal as a sequence for high and low modulation level signals in accordance with the digital data and for inserting the input modulation signal into said phase lock loop; and
   d) a balancing circuit comprising a first programmable reference modulation shaping circuit and a second programmable voltage controlled oscillator shaping circuit, each of said first and second shaping circuits having an input for receiving the digital data and for generating respectively a first reference modulation signal and a second voltage controlled oscillator modulation signal, each of said first and second modulation signals comprising a sequence of the high and low modulation voltages in accordance respectively with the first and second data levels of the digital data; and
   e) a controller for programming distinctly the amplitudes of the high and low modulation voltages of the first and second modulation signals, whereby the first and second modulation signals are apportioned between said reference modulation port and said voltage controlled oscillator modulation port.

* * * * *